(12) United States Patent
Hayashi et al.

(10) Patent No.: US 10,205,868 B2
(45) Date of Patent: Feb. 12, 2019

(54) LIVE VIEW CONTROL DEVICE, LIVE VIEW CONTROL METHOD, LIVE VIEW SYSTEM, AND PROGRAM

(71) Applicant: FUJIFILM Corporation, Tokyo (JP)

(72) Inventors: Daisuke Hayashi, Saitama (JP); Mikio Watanabe, Saitama (JP); Takeshi Misawa, Saitama (JP); Masaya Tamaru, Saitama (JP); Hiroyuki Oshima, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/449,281

(22) Filed: Mar. 3, 2017

(65) Prior Publication Data

US 2017/0180626 A1 Jun. 22, 2017

Related U.S. Application Data

(63) Continuation of application No. PCT/JP2015/068130, filed on Jun. 24, 2015.

(30) Foreign Application Priority Data

Sep. 11, 2014 (JP) .................................. 2014-184950

(51) Int. Cl.
*H04N 5/222* (2006.01)
*H04N 5/232* (2006.01)
(Continued)

(52) U.S. Cl.
CPC ..... *H04N 5/23206* (2013.01); *H04N 5/23216* (2013.01); *H04N 5/23293* (2013.01);
(Continued)

(58) Field of Classification Search
CPC ........... H04N 5/23206; H04N 5/23293; H04N 21/4223; H04N 7/181; H04N 7/185; H04N 7/188
See application file for complete search history.

(56) References Cited

U.S. PATENT DOCUMENTS

| 2003/0156212 | A1 | 8/2003 | Kingetsu et al. |
| 2006/0095539 | A1* | 5/2006 | Renkis .................... H04W 4/70 709/217 |

(Continued)

FOREIGN PATENT DOCUMENTS

| JP | 2002-351438 A | 12/2002 |
| JP | 2003-244529 A | 8/2003 |

(Continued)

OTHER PUBLICATIONS

International Search Report (PCT/ISA/210), issued in PCT/JP2015/068130, dated Sep. 29, 2015.

(Continued)

*Primary Examiner* — Kelly L Jerabek
(74) *Attorney, Agent, or Firm* — Birch, Stewart, Kolasch & Birch, LLP

(57) ABSTRACT

A live view control device according to an aspect of the present invention includes a display control unit that displays each of a plurality of live view images received from a plurality of imaging devices in each of a plurality of areas of a display screen, a priority setting unit that sets a priority of the plurality of live view images, a transfer condition setting unit that sets transfer conditions including at least one of a frame rate of transfer and an image size of the transfer of the plurality of live view images on the basis of the priority of the plurality of live view images, and a communication control unit that transmits a transfer instruction for a live view image according to the set transfer (Continued)

conditions to the plurality of imaging devices via the wireless communication unit.

20 Claims, 17 Drawing Sheets

(51) Int. Cl.
*H04N 5/445* (2011.01)
*H04N 7/18* (2006.01)
*H04N 21/218* (2011.01)
*H04N 21/2187* (2011.01)
*H04N 21/414* (2011.01)
*H04N 21/431* (2011.01)
*H04N 21/485* (2011.01)
*H04N 21/6373* (2011.01)

(52) U.S. Cl.
CPC ......... *H04N 5/44591* (2013.01); *H04N 7/181* (2013.01); *H04N 7/185* (2013.01); *H04N 21/2187* (2013.01); *H04N 21/21805* (2013.01); *H04N 21/41407* (2013.01); *H04N 21/4314* (2013.01); *H04N 21/4854* (2013.01); *H04N 21/6373* (2013.01); *G03B 2206/00* (2013.01)

(56) References Cited

U.S. PATENT DOCUMENTS

| | | | |
|---|---|---|---|
| 2011/0158313 A1 | 6/2011 | Ogata | |
| 2013/0044225 A1* | 2/2013 | Jeon | H04N 5/2351 348/207.1 |
| 2015/0201164 A1* | 7/2015 | Yun | H04N 7/181 348/159 |
| 2017/0180624 A1* | 6/2017 | Renkis | H04N 5/23206 |

FOREIGN PATENT DOCUMENTS

| | | |
|---|---|---|
| JP | 2007-166420 A | 6/2007 |
| JP | 2007-214831 A | 8/2007 |
| JP | 2011-82901 A | 4/2011 |
| JP | 2011-139200 A | 7/2011 |
| JP | 2013-93824 A | 5/2013 |
| JP | 2013-150159 A | 8/2013 |
| JP | 2014-38336 A | 2/2014 |

OTHER PUBLICATIONS

Written Opinion of the International Searching Authority (PCT/ISA/237), issued in PCT/JP2015/068130, dated Sep. 29, 2015.

* cited by examiner

FIG. 4

| IMAGING DEVICE | LIVE VIEW IMAGE | DISPLAY ASPECT | DISPLAY SITUATION | PRIORITY | TRANSFER CONDITIONS (SET VALUES) | MEASUREMENT VALUE |
|---|---|---|---|---|---|---|
| 10A | LV1 | LAYOUT 3-4 DISPLAY POSITION 1 | PERSON 1 | 1 | 60 | 15 |
| 10B | LV2 | LAYOUT 3-4 DISPLAY POSITION 2 | PERSON 2 | 2 | 60 | 15 |
| 10C | LV3 | LAYOUT 3-4 DISPLAY POSITION 3 | NO PERSON | 2 | 60 | 15 |

FIG. 8
(1) 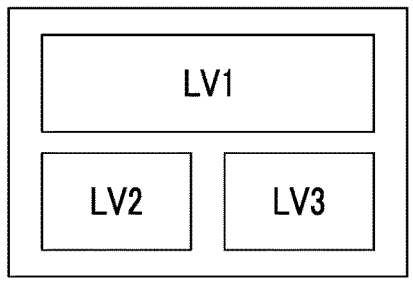
(2) 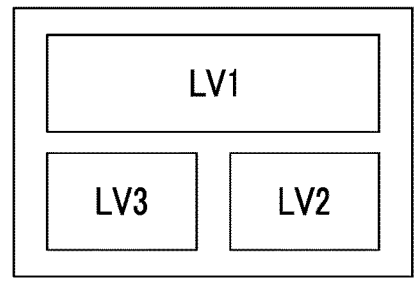
(3) 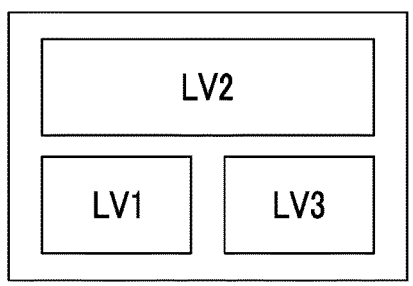
(4) 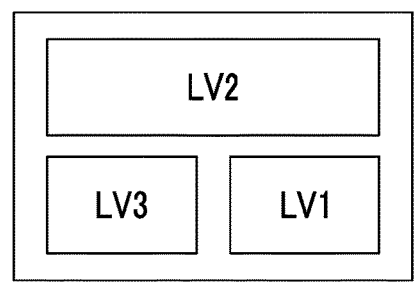
(5) 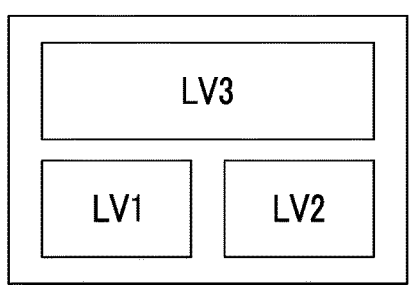
(6) 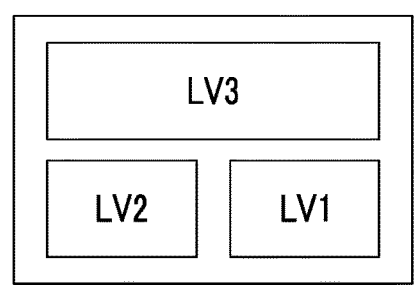

LIVE VIEW CONTROL DEVICE, LIVE VIEW CONTROL METHOD, LIVE VIEW SYSTEM, AND PROGRAM

CROSS-REFERENCE TO RELATED APPLICATIONS

This application is a Continuation of PCT International Application No. PCT/JP2015/068130 filed on Jun. 24, 2015, which claims priority under 35 U.S.C. § 119(a) to Japanese Patent Application No. 2014-184950 filed on Sep. 11, 2014. Each of the above applications is hereby expressly incorporated by reference, in their entirety, into the present application.

BACKGROUND OF THE INVENTION

1. Field of the Invention

The present invention relates to a live view control device, a live view control method, a live view system, and a program, and more particularly, to a live view control device, a live view control method, a live view system, and a program that receive a plurality of live view images from a plurality of imaging device through wireless communication.

2. Description of the Related Art

A technology of degrading a frame rate of a display of a live view image under specific conditions in an imaging device having an imaging function for imaging a subject and recording a captured image is known. JP2013-150159A discloses a technology for increasing a frame rate of a display of a live view image not to miss a shutter chance in a case where it is detected that a user is about to image a subject, and decreasing the frame rate of the live view image display to suppress power consumption in a case where it is detected that a user is not about to image a subject. JP2003-244529A discloses a technology for reducing a load of an entire processing system including an internal bus by decreasing a frame rate of a display of a live view image at the time of continuous imaging in an imaging device.

Further, JP2011-082901A discloses a technology for setting a narrower motion detection range for a subject when a value of a frame rate of a live view image display increases, for the purpose of shortening a detection processing time for a motion of the subject.

Further, a technology for receiving a plurality of images from a plurality of terminal devices through wireless communication and creating and displaying a multi-screen image is known. JP2014-038336A discloses a technology for switching a connection of a plurality of terminals according to a priority of the plurality of terminals.

SUMMARY OF THE INVENTION

A user terminal such as a smartphone or a tablet terminal is required to receive a plurality of live view images transmitted from a plurality of imaging devices through wireless communication and display the plurality of live view images on a display screen (hereinafter referred to as "multi-live view").

However, a load of transfer of a plurality of live view images from a plurality of imaging devices to a user terminal, and a load of processing of the plurality of live view images in the user terminal increase as the number of imaging devices that transmit live view images increases. Accordingly, an actual frame rate of a live view image display in the user terminal may be degraded. That is, there arises a problem in that display image quality of a multi-live view is degraded due to an increase in the number of imaging devices connected by wireless communication.

JP2013-150159A, JP2003-244529A, JP2011-082901A, and JP2014-038336A do not pay attention to a problem of degradation of display image quality in such multi-live view. Even when the technologies described in JP2013-150159A, JP2003-244529A, JP2011-082901A, and JP2014-038336A are applied to the multi-live view, the above-described problems cannot be solved.

JP2013-150159A and JP2003-244529A merely disclose a technology for controlling a frame rate of a display of a live view image, and originally lack the perspective of reducing a transfer load of wireless communication between a plurality of imaging devices and a user terminal. Further, according to the technology described in JP2013-150159A, a frame rate of a display may be degraded even when a live view image is important. According to the technology described in JP2003-244529A, a frame rate of a display at the time of live view of non-consecutive imaging is always maintained not to be degraded.

JP2011-082901A mentions a relationship between a motion of a subject and a frame rate of a display, but does not originally disclose or suggest reducing a transfer load of wireless communication between a plurality of imaging devices and a user terminal.

JP2014-038336A merely discloses setting a priority for a plurality of terminals and does not disclose or suggest setting a priority for a plurality of live view images.

In the multi-live view, importance may be different between a plurality of live view images irrespective of a difference (for example, a differences in model or a difference in imaging performance) among a plurality of imaging devices. Accordingly, even when a configuration in which a priority is set among the plurality of imaging devices according to the difference between the plurality of imaging devices using the technology described in JP2014-038336A is adopted, the frame rate of the live view image with high importance may be degraded. Accordingly, it can be said that it is difficult to reliably maintain the display quality of the live view image with high importance.

The present invention has been made in view of the above circumstances, and an object of the present invention is to provide a live view control device, a live view control method, a live view system, and a program capable of performing load reduction while maintaining display quality of a live view image with high importance even when the number of imaging devices increases in a case where a plurality of live view images captured by a plurality of imaging devices are received through wireless communication and displayed.

An aspect of the present invention is a live view control device, comprising: a wireless communication unit that receives a plurality of live view images from a plurality of imaging devices through wireless communication; a display control unit that displays each of the plurality of live view images received from the plurality of imaging devices in each of a plurality of areas of a display screen capable of displaying an image; a priority setting unit that sets a priority of the plurality of live view images among the plurality of live view images; a transfer condition setting unit that sets transfer conditions including at least one of a frame rate of transfer and an image size of the transfer of the plurality of live view images on the basis of the priority of the plurality of live view images; and a communication control unit that transmits the transfer conditions set by the transfer condition setting unit to the plurality of imaging devices via the wireless communication unit.

According to this aspect, since the transfer conditions including at least one of the frame rate of the transfer of the plurality of live view images and the image size of the transfer are set on the basis of the priority set among the plurality of live view images and transmitted to the plurality of imaging devices, it is possible to perform a load reduction while maintaining display image quality of the live view image with high importance among the plurality of live view images even when the number of imaging devices connected through radio communication increases.

In an aspect of the present invention, the priority setting unit sets the priority of the plurality of live view images on the basis of at least one of a display aspect and a display situation of the live view image.

According to this aspect, it is possible to automatically set the priority of the plurality of live view images on the basis of at least one of the display aspect of the plurality of live view images and the display situation of the plurality of live view images. Accordingly, it is possible to reliably maintain display image quality of the live view image with high importance among the plurality of live view images. In a case where there is a change in the display aspect, the priority of the plurality of live view images is automatically set and the display image quality of the live view image with high importance is reliably maintained. In a case where the display situation has been changed, the priority of the plurality of live view images is automatically set, and the display image quality of the live view image with high importance is reliably maintained.

In an aspect of the present invention, the priority setting unit sets the priority of the live view image according to at least one of a display size and a display position of the live view image.

According to this aspect, the priority of the plurality of live view images can be automatically set according to at least one of the display size and the display position of the live view image that is set by a user.

In an aspect of the present invention, the priority setting unit sets the priority of the live view image according to whether a predetermined specific subject image exists in the live view image, or which of a plurality of subject images having a predetermined priority is the subject image in the live view image.

According to this aspect, the priority of the plurality of live view images is automatically set according to a subject image in a plurality of live view images that are captured and transferred by a plurality of imaging devices.

In an aspect of the present invention, the priority setting unit sets the priority of the live view image according to at least one of whether or not a moving body image exists in the live view image, a size of the moving body image in the live view image, and a movement speed of the moving body image.

According to this aspect, the priority of the plurality of live view images is automatically set according to a moving body image in a plurality of live view images that are captured and transferred by a plurality of imaging devices.

In an aspect of the present invention, the live view control device further comprises: a first transfer condition change determination unit that determines whether or not the transfer conditions are changed on the basis of a result of comparison between at least one of an actual frame rate and an actual image size of one or a plurality of live view images having a specific priority or a higher priority received from the plurality of imaging devices among the plurality of live view images and a threshold value, in which the transfer condition setting unit changes the transfer conditions on the basis of a determination result of the first transfer condition change determination unit.

According to this aspect, even when the number of imaging devices increases, it is possible to change the transfer conditions while accurately maintaining the display image quality of the live view image with a high priority.

In an aspect of the present invention, the live view control device further comprises: a second transfer condition change determination unit that determines whether or not the transfer conditions are changed on the basis of a result of comparison between a sum over the plurality of imaging devices of at least one of an actual frame rate and an actual image size of the plurality of live view images and a threshold value, in which the transfer condition setting unit changes the transfer conditions in a case where the second transfer condition change determination unit determines that the transfer conditions are changed.

According to this aspect, even when the number of imaging devices increases, transfer conditions are changed according to a sum over the plurality of imaging devices of at least one of the actual frame rates of the plurality of live view images and the actual image size.

In an aspect of the present invention, the live view control device further comprises: a third transfer condition change determination unit that determines whether or not the transfer conditions are changed on the basis of both of an actual frame rate and an actual image size of the plurality of live view image, in which the transfer condition setting unit changes the transfer conditions in a case where the third transfer condition change determination unit determines that the transfer conditions are changed.

According to this aspect, since the transfer conditions change in consideration of both of the actual frame rate and the actual image size, it is possible to maintain display image quality of the plurality of live view images in a case where the image size is small even when the frame rate is high or in a case where the frame rate is low even when the image size is large.

In an aspect of the present invention, the live view control device further comprises a display aspect instruction input unit that receives an instruction input for at least one of a display size and a display position of the live view image.

In an aspect of the present invention, the live view control device further comprises a priority instruction input unit that receives an instruction input for a priority of the plurality of live view images.

According to this aspect, it is possible to maintain display image quality of the plurality of live view images even in a case where a user directly instructs and inputs the priority of the plurality of live view images.

An aspect embodiment of the present invention relates to a live view system, comprising: an imaging device; and the live view control device.

An aspect of the present invention relates to a live view control device, comprising: a step of receiving a plurality of live view images from a plurality of imaging devices through wireless communication; a step of displaying each of the plurality of live view images received from the plurality of imaging devices in each of a plurality of areas of a display screen capable of displaying an image; a priority setting step of setting a priority of the plurality of live view images among the plurality of live view images; a transfer condition setting step of setting transfer conditions including at least one of a frame rate of transfer and an image size of the transfer of the plurality of live view images on the basis of the priority of the plurality of live view images; and a step of transmitting the set transfer conditions to the plurality of imaging devices through wireless communication.

In an aspect of the present invention, the priority setting step includes setting the priority of the plurality of live view images on the basis of at least one of a display aspect and a display situation of the live view image.

In an aspect of the present invention, the priority setting step includes setting the priority of the live view image according to at least one of a display size and a display position of the live view image.

In an aspect of the present invention, the priority setting step includes setting the priority of the live view image according to whether a predetermined specific subject image exists in the live view image, or which of a plurality of subject images having a predetermined priority is the subject image in the live view image.

In an aspect of the present invention, the priority setting step includes setting the priority of the live view image according to at least one of whether or not a moving body image exists in the live view image, a size of the moving body image in the live view image, and a movement speed of the moving body image.

In an aspect of the present invention, the live view control method further comprises a first determination step of determining whether or not the transfer conditions are changed on the basis of a result of comparison between at least one of an actual frame rate and an actual image size of one or a plurality of live view images having a specific priority or a higher priority received from the plurality of imaging devices among the plurality of live view images and a threshold value, in which the transfer conditions are changed on the basis of a determination result of the first determination step.

In an aspect of the present invention, the live view control method further comprises a second determination step of determining whether or not the transfer conditions are changed on the basis of a result of comparison between a sum over the plurality of imaging devices of at least one of an actual frame rate and an actual image size of the plurality of live view images and a threshold value, in which the transfer conditions are changed on the basis of a determination result of the second determination step.

In an aspect of the present invention, the live view control method further comprises a third determination step of determining whether or not the transfer conditions are changed on the basis of both of an actual frame rate and an actual image size of the plurality of live view image, in which the transfer conditions are changed on the basis of a determination result of the third determination step.

An aspect of the present invention relates to a program that causes a computer to execute: a step of receiving a plurality of live view images from a plurality of imaging devices through wireless communication; a step of displaying each of the plurality of live view images received from the plurality of imaging devices in each of a plurality of areas of a display screen capable of displaying an image; a priority setting step of setting a priority of the plurality of live view images among the plurality of live view images; a transfer condition setting step of setting transfer conditions including at least one of a frame rate of transfer and an image size of the transfer of the plurality of live view images on the basis of the priority of the plurality of live view images; and a step of transmitting the set transfer conditions to the plurality of imaging devices through wireless communication. A computer-readable non-transitory recording medium having this program recorded thereon is also included in an aspect of the present invention.

According to the present invention, it is possible to perform load reduction while maintaining display quality of a live view image with high importance even when the number of imaging devices increases in a case where a plurality of live view images captured by a plurality of imaging devices are received through wireless communication and displayed.

BRIEF DESCRIPTION OF THE DRAWINGS

FIG. 4 is an illustrative diagram illustrating an example of multi-live view control information.

FIG. 8 is a second illustrative diagram that is used for description of setting of a layout (an example of a display aspect).

DESCRIPTION OF THE PREFERRED EMBODIMENTS

Hereinafter, embodiments of the present invention will be described with reference to the drawings.

[Configuration of Live View System]

Figure 1:
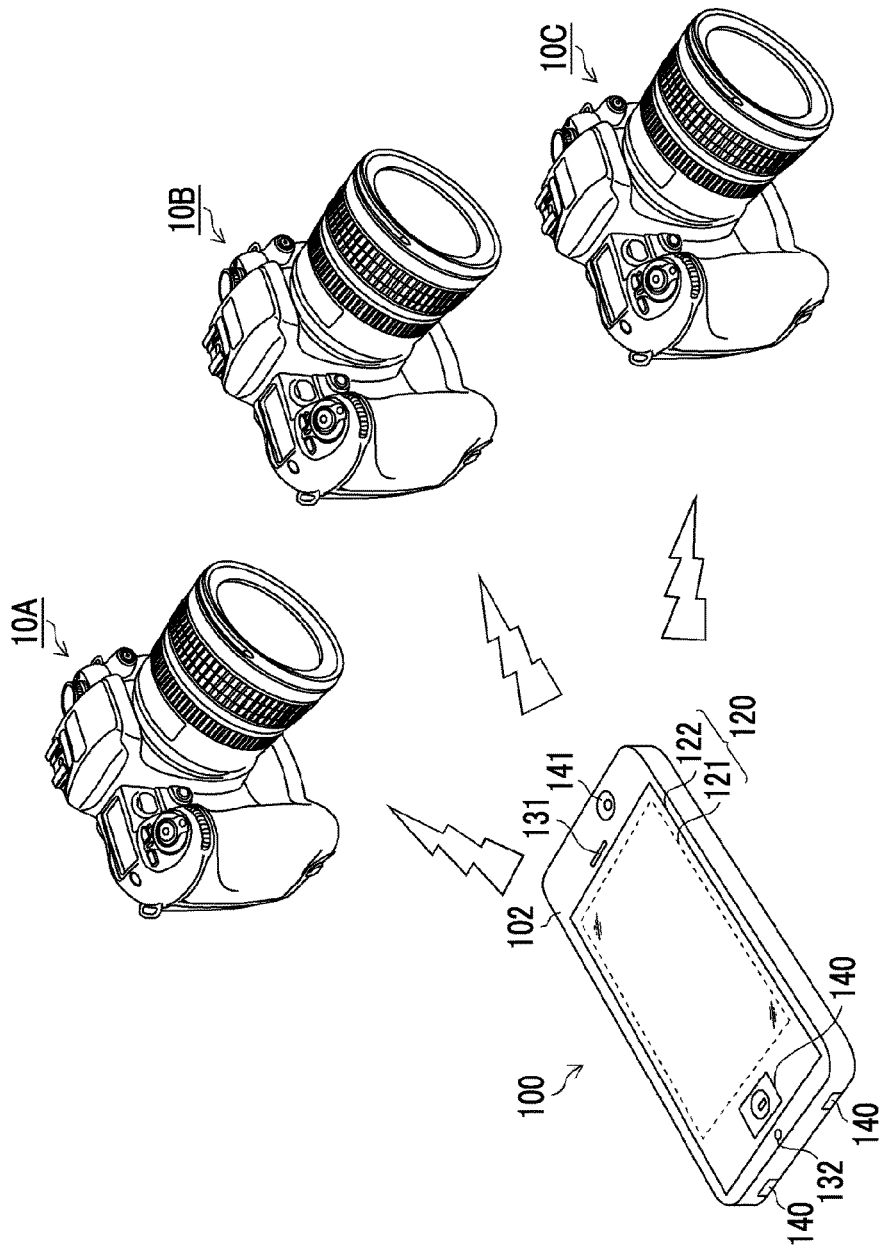
FIG. 1 is a configuration diagram illustrating an example of a live view system including a plurality of imaging devices and a smartphone.

FIG. 1 is a configuration diagram illustrating an example of a live view system including a plurality of imaging devices 10A, 10B, and 10C and a smartphone 100. Hereinafter, at least one of the plurality of imaging devices 10A, 10B, and 10C may be referred to as an "imaging device 10" in some cases.

In this example, each of the plurality of imaging devices 10A, 10B, and 10C and the smartphone 100 directly perform wireless communication.

[Example of Hardware Configuration of Smartphone]

Figure 2:
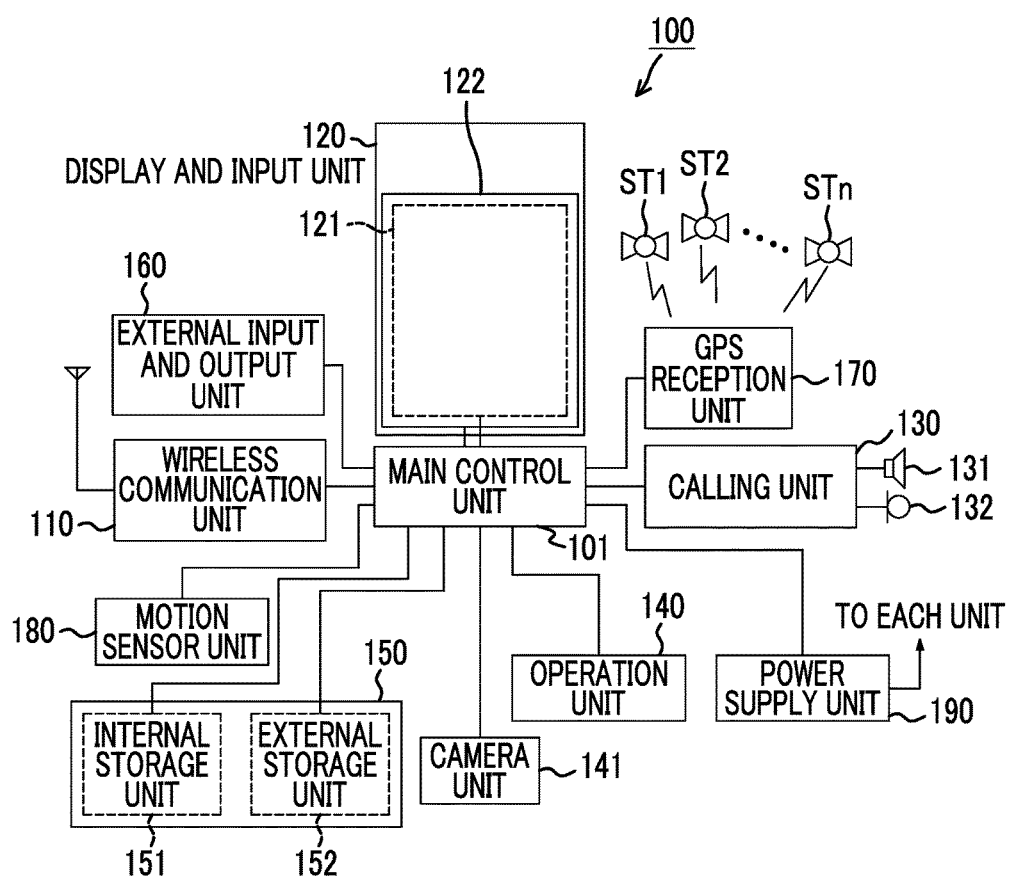
FIG. 2 is a configuration diagram illustrating a hardware configuration example of a smartphone which is an example of a live view control device.

FIG. 2 is a block diagram illustrating a hardware configuration of the smartphone 100 illustrated in FIG. 1.

As illustrated in FIG. 2, main components of the smartphone 100 include a wireless communication unit 110, a display and input unit 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication via a base station device and a mobile communication network.

The wireless communication unit 110 performs wireless communication with the base station device accommodated in the mobile communication network according to an instruction of the main control unit 101. Using this wireless communication, transmission and reception of various types of file data such as audio data and image data, e-mail data, or the like, or reception of web data, streaming data, or the like is performed. In this example, the wireless communication unit 110 of the smartphone 100 transmits an instruction input for various operations to the imaging device 10, or receives a live view image, an image for recording, or the like from the imaging device 10.

The display and input unit 120 is a so-called touch panel that displays an image (a still image and a video), text information, or the like to visually deliver information to a user under the main control unit 101, and detects a user operation for the displayed information. The display and input unit 120 includes a display panel 121 and an operation panel 122. In a case in which a 3D image is viewed, it is preferable for the display panel 121 to be a 3D display panel.

The display panel 121 uses a liquid crystal display (LCD), an organic electro-Luminescence display (OELD), or the like as a display device.

The operation panel 122 is a device that is placed so that an image displayed on the display panel 121 can be viewed, and detects one or a plurality of coordinates operated by a finger of a user or a stylus. If this device is operated by the finger of the user or the stylus, the operation panel 122 outputs a detection signal generated due to the operation to the main control unit 101. Then, the main control unit 101 detects an operation position (coordinates) on the display panel 121 on the basis of the received detection signal.

As illustrated in FIG. 1, the display panel 121 and the operation panel 122 of the smartphone 100 are integrally formed to constitute a display and input unit 120, but the operation panel 122 is arranged to completely cover the display panel 121. In a case in which this arrangement is adopted, the operation panel 122 may also have a function of detecting a user operation for an area other than the display panel 121. In other words, the operation panel 122 may include a detection area (hereinafter referred to as a display area) for an overlapping portion which overlaps the display panel 121, and a detection area (hereinafter referred to as a non-display area) for an outer edge portion which does not overlap the display panel 121, other than the display area.

A size of the display area and a size of the display panel 121 may completely match, but do not need to necessarily match. Further, the operation panel 122 may include two sensitive areas including the outer edge portion and an inner portion other than the outer edge portion. Further, a width of the outer edge portion may be appropriately designed according to, for example, a size of a housing 102. Further, a position detection scheme adopted in the operation panel 122 may include a matrix switch scheme, a resistive film scheme, a surface acoustic wave scheme, an infrared scheme, an electromagnetic induction scheme, a capacitive scheme, and the like, and any one of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the display and input unit 120 is provided.

The operation unit 140 is a hardware key using a key switch or the like, and receives an instruction from the user. For example, the operation unit 140 is mounted on a lower surface in a lower portion in a display portion of the housing 102 of the smartphone 100, and is a push button switch that is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. Further, the storage unit 150 includes an internal storage unit 151 built in the smartphone and an external storage unit 152 having a slot for an external memory that is detachable. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module (SIM)/user identity module (UIM) card connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and an earphone. The external input-output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a three-axis acceleration sensor, and detects a physical motion of the smartphone 100 according to an instruction of the main control unit 101. By detecting the physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function includes an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying an image on the display and input unit 120 based on image data (data of a still image or a video) such as received data or downloaded streaming data. The image processing function refers to a function of the main control unit 101 decoding the image data, performing image processing on a result of the decoding, and displaying the image on the display and input unit 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display area of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion that overlaps the display panel 121 (display area) or the other outer edge portion (non-display area) that does not overlap the display panel 121, and controlling the sensitive area of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD). Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101. In the smartphone 100 illustrated in FIG. 1, the camera unit 141 is mounted on the same surface as the display and input unit 120, but a mounting position of the camera unit 141 is not limited thereto and may be mounted on a back surface of the display and input unit 120. Alternatively, a plurality of camera units 141 may be mounted. In a case in which the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using the 3-axis acceleration sensor, or in combination with the 3-axis acceleration sensor. Of course, the image from the camera unit 141 can also be used within the application software.

In this example, by downloading application software for operating the imaging device 10 over a network or the like, storing the application software in the storage unit 150, and operating the main control unit 101 according to the downloaded application software using the application processing function of the smartphone 100, the general-purpose smartphone 100 functions as a user interface (UI unit) for operating the imaging device 10.

Figure 3:
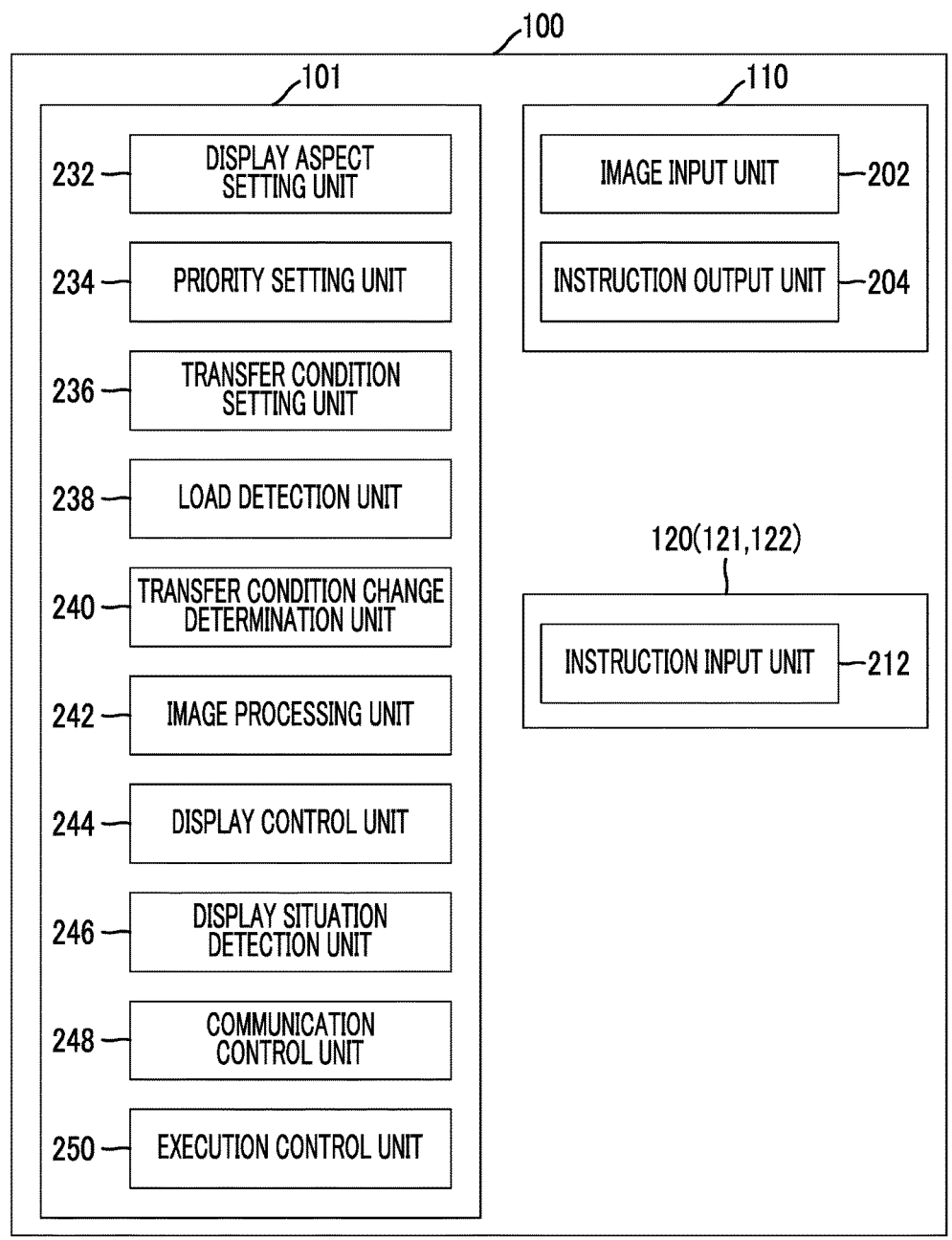
FIG. 3 is a block diagram illustrating a configuration example of main units of a live view control device of the present invention.

FIG. 3 is a block diagram illustrating a configuration example of main components of a live view control device of the present invention. In FIG. 3, the smartphone 100 is an example of a live view control device of the present invention.

The wireless communication unit 110 of the smartphone 100 is used as an image input unit 202 that receives (inputs) the plurality of live view images from the plurality of the imaging devices 10, and an instruction output unit 204 that transmits (outputs) an instruction of transfer conditions to the plurality of imaging devices 10.

The display and input unit 120 of the smartphone 100 is used as an instruction input unit 212 that receives an instruction input of the user. The instruction input unit 212 constitutes an example of a display aspect instruction input unit in the present invention, and receives an instruction input for a display aspect of a plurality of live view images (for example, an instruction input for at least one of a display size and a display position of the live view image).

The main control unit 101 of the smartphone 100 includes a display aspect setting unit 232 that sets a display aspect of a plurality of live view images, a priority setting unit 234 that sets a priority of a plurality of live view images among a plurality of live view images, a transfer condition setting unit 236 that sets transfer conditions including at least one of a frame rate of transfer of the plurality of live view images and an image size of the transfer on the basis of the priority among the live view images, a load detection unit 238 that detects at least one of load of transfer (hereinafter simply referred to as a "transfer load") of the live view image from the imaging device 10 to the smartphone 100 and a load of processing (hereinafter simply referred to as a "processing load") of the live view image in the smartphone 100, a transfer condition change determination unit 240 that determines whether the transfer conditions to be set for the plurality of imaging devices 10 is changed on the basis of the load detected by the load detection unit 238, an image processing unit 242 that performs image processing on the live view image received from the plurality of imaging devices 10, a display control unit 244 that displays each of the plurality of live view images received from the plurality of the imaging devices 10 in each of a plurality of areas of the display panel 121 (which is an example of a display screen capable of displaying an image), a display situation detection unit 246 that detects a display situation of the live view image, a communication control unit 248 that transmits the transfer conditions set by the transfer condition setting unit 236 and an instruction to transfer the live view image to the plurality of imaging devices 10 via the wireless communication unit 110, and an execution control unit 250 that controls execution of processing in each unit of the smartphone 100 according to a program stored in the storage unit 150.

Next, an aspect of setting of a priority in the priority setting unit 234 of the smartphone 100 will be described. The priority setting unit 234 of the smartphone 100 sets the priority of the live view images on the basis of at least one of the display aspect and the display situation of a plurality of live view images. The display aspect indicates an aspect in which the display control unit 244 displays the live view image on the display panel 121 in this disclosure. The display situation indicates a situation of a display of the live view image actually displayed on the display panel 121 under control of the display control unit 244 in this disclosure.

The aspect of a display of the live view image may include the following examples.

A display size of the live view image.
A display position of the live view image.
Whether or not to enlarge and display the live view image. Alternatively, an enlargement rate.
Whether or not to blur and display the live view image. Alternatively, a blur rate.
Whether or not to highlight and display the live view image. For example, whether or not an area is an area of a backlight display.
Presence or absence of stage effects of a live view image display. Alternatively, a type of stage effects.

The display situation of the live view image may include the following examples.

Presence or absence of a specific subject image in the live view image.
Importance of a subject image in the live view image (for example, a predetermined order of subject images).
At least one of presence or absence, a size, and a movement speed of a moving subject image in the live view image.
A background in the live view image.
Continuous display time of the live view image.

The display aspect of the live view image may be set and input by the user using the display aspect setting unit 232 or may be automatically set.

The display situation of the live view image may be detected from the live view image by the display situation detection unit 246 or may be detected from information that the imaging device 10 has added to the live view image. The user may determine the display situation from the displayed live view image and input information corresponding to the display situation to the smartphone 100.

The display aspect and the display situation of the live view image are not particularly limited to the above-described examples.

Next, a determination aspect of transfer condition change in the transfer condition change determination unit 240 of the smartphone 100 will be described.

In a first determination aspect, the transfer condition change determination unit 240 functions as a first transfer condition change determination unit in the present invention, and determines whether or not the transfer conditions are changed on the basis of a result of comparison between an actual frame rate (which is a measurement value) of a live view image having a specific priority or a higher priority among the plurality of live view images and a threshold value. Only the actual frame rate of the live view image having the highest priority may be compared with the threshold value. Preferably, the transfer condition change determination unit 240 also functions as a third transfer condition change determination unit in the present invention, and performs the above determination on the basis of both of the actual frame rate (which is a measurement value) and the actual image size (which is a measurement value). Further, the present invention includes a case where the determination is performed on the basis of only the actual image size.

Here, the "actual frame rate" and the "actual image size" may be different from the frame rate and the image size set in the imaging device 10 when the transfer load or the processing load is high. The load detection unit 238 monitors the frame rate and the image size of the live view image until the live view image is received from the imaging device 10 and displayed on the display panel 121 to detect the actual frame rate and the actual image size, and obtains a result of a comparison with a threshold value. For example, the "actual frame rate" and the "actual image size" are detected as a difference (which is a relative value) with the frame rate (which is a set value) and the image size (which is a set value) set for the imaging device 10, respectively. Preferably, the actual image size and the actual frame rate are integrated, integrated values are summed (totalized) over the live view images having a specific priority or higher priorities, and a sum is compare with a threshold value. Only the integrated value of the live view image having the highest priority may be compared with a threshold value.

In a second determination aspect, the transfer condition change determination unit 240 functions as a second transfer condition change determination unit in the present invention to sum (totalize) the actual frame rates (which are measurement values) of the plurality of live view images over all of a plurality of imaging devices 10A, 10B, and 10C, and determines whether to change the transfer conditions on the basis of a result of a comparison between the sum and the threshold value. Preferably, the transfer condition change determination unit 240 also functions as a third transfer condition change determination unit in the present invention to determine the above determination on the basis of the actual frame rate (which is a measurement value) and the actual image size (which is a measurement value). Further, the present invention includes a case where the determination is performed on the basis of only the actual image size.

FIG. 4 illustrates an example of multi-live view control information that is managed by the main control unit 101 of the smartphone 100. Information of column "Imaging Device" in FIG. 4 is identification information indicating the plurality of imaging devices 10A, 10B, and 10C illustrated in FIG. 1. Information of column "Live View Image" in FIG. 4 is identification information indicating the plurality of live view images LV1, LV2, and LV3 that are received from the plurality of imaging devices 10A, 10B, and 10C illustrated in FIG. 1 through wireless communication. Information of column "Display Aspect" of FIG. 4 indicates an example of a display aspect of each live view image. The "Display Aspect" in this example indicates the display size and the display position instructed and input by a user using the instruction input unit 212. Information of column "Display Situation" in FIG. 4 indicates an example of a display situation of the live view image. The "Display Situation" in this example is detected from the live view image by the display situation detection unit 246. Information of column "Priority" in FIG. 4 indicates a priority among the plurality of live view images. "Priority" of this example is set by the priority setting unit 234. There are a case where the priority is "1", "2", and "2" (that is, a case where there are both of a combination of different priorities and a combination of the same priorities among the plurality of live view images), and a case where the priority is "1", "2", and "3" (that is, a case where priorities are different in all combinations among the plurality of live view images), as illustrated in FIG. 4. Information of column "Transfer Conditions" of FIG. 4 is transfer conditions (set value) that are transmitted to the plurality of respective imaging devices 10A, 10B, and 10C and set in the respective imaging devices. The transfer conditions of this example are set in the transfer condition setting unit 236. A "Measurement Value" in FIG. 4 indicates a state of actual transfer and processing of the live view image (which is a load state). The "Measurement Value" of this example is measured by the load detection unit 238 of the smartphone 100. A magnitude of the "Measurement Value" of this example corresponds to a magnitude of a load (a transfer load and a processing load). Although the "Measurement Value" in this disclosure has a smaller value when the load increases, the "Measurement Value" may be measured to have a greater value when the load increases. In the latter case, it should be noted that a magnitude relationship between the measurement value and a threshold value is reversed to description in this disclosure.

The multi-live view control information illustrated in FIG. 4 is an example, and information for controlling the execution of the multi-live view is not particularly limited to the information illustrated in FIG. 4.

Figure 5:
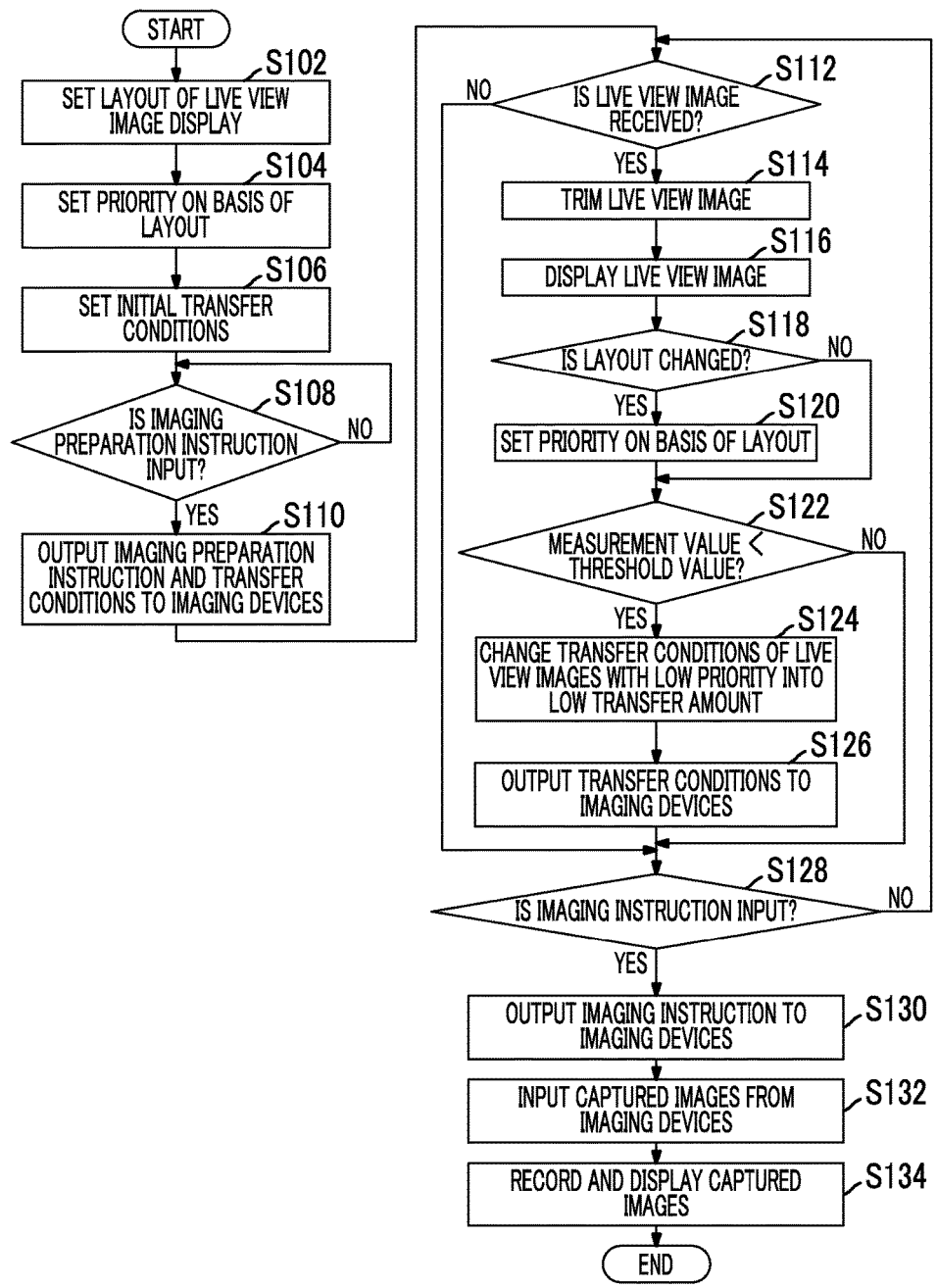
FIG. 5 is a flowchart illustrating a flow of a first embodiment of a live view control method.

A flow of a first embodiment of a live view control method in the smartphone 100 will be described using a flowchart of FIG. 5. The process in the smartphone 100 illustrated in FIG. 5 is executed according to a program stored in the storage unit 150 of the smartphone 100 by the execution control unit 250 of the smartphone 100. The imaging device 10 is assumed to be a state in which a power switch has been already turned on and initialization has ended.

The display aspect setting unit 232 of the smartphone 100 performs setting of a layout of a live view image display (which is an example of a display aspect) (step S102).

Figure 6:
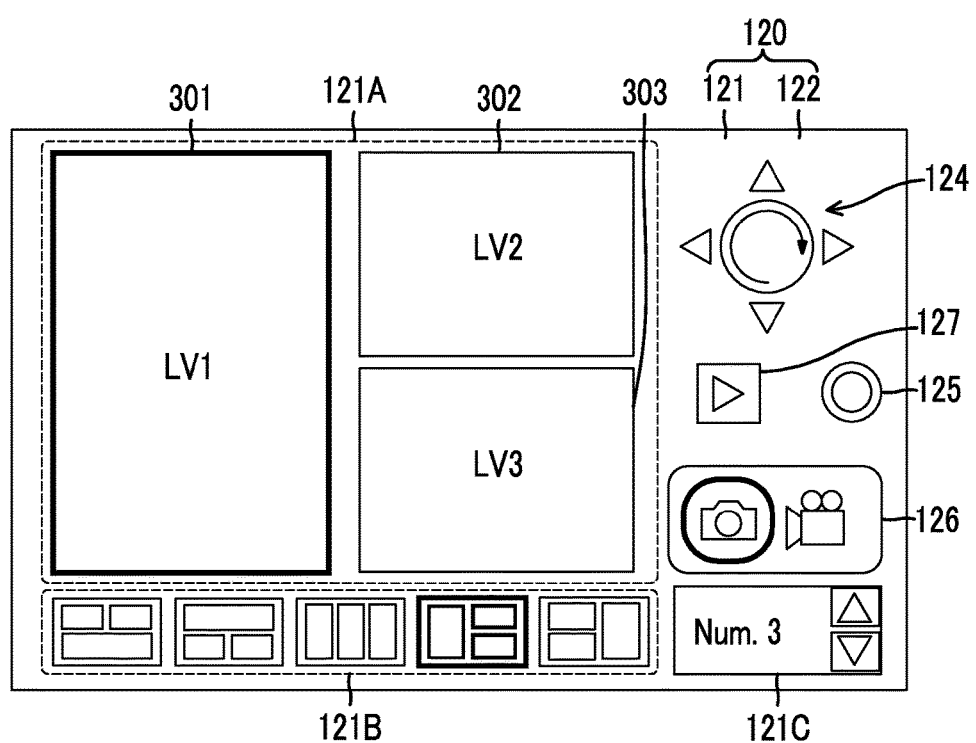
FIG. 6 is an illustrative diagram that is used for description of a display screen.

For example, as illustrated in FIG. 6, a multi-live view screen including a live view image display area 121A, a layout pattern selection area 121B, and an imaging device number selection area 121C is displayed on the display panel 121 (which is an example of a display screen) of the display and input unit 120. The live view image display area 121A includes a plurality of areas (a first image display area 301, a second image display area 302, and a third image display area 303) for displaying a plurality of live view images LV1 to LV3 that are received from the plurality of imaging devices 10A to 10C. Further, the live view images LV1 to LV3 are not displayed in this step. The layout pattern selection area 121B is an area for displaying patterns (shapes) of a layout selectable corresponding to the number of imaging devices selected and input in the imaging device number selection area 121C and receiving a selection input of the pattern of the layout from the user. Reference numerals 124 to 127 are icon buttons.

Figure 7:
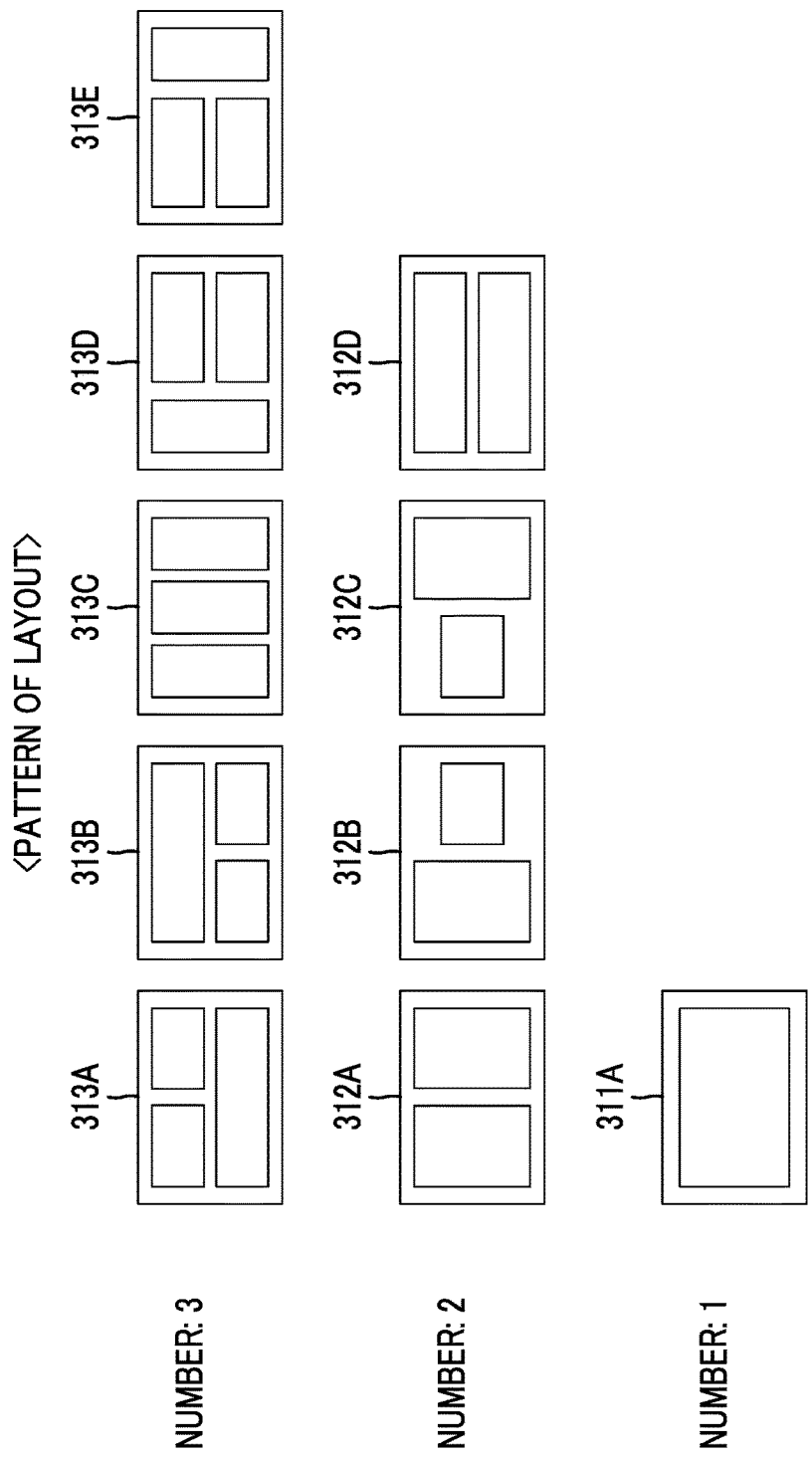
FIG. 7 is a first illustrative diagram that is used for description of setting of a layout (an example of a display aspect).

In a state in which such a multi-live view screen is displayed on the display and input unit 120, the user can select a desired layout pattern from among a plurality of layout patterns illustrated in FIG. 7 (pattern 311A in a case where the imaging device number is 1, patterns 312A, 312B, 312C, and 312D in a case where the imaging device number is 2, and patterns 313A, 313B, 313C, 313D, and 313E) in a case where the imaging device number is 3 by selecting and inputting the number of imaging devices in the imaging device number selection area 121C and selecting and inputting a pattern of a layout determined for each number of imaging units in the layout pattern selection area 121B.

Figure 9:
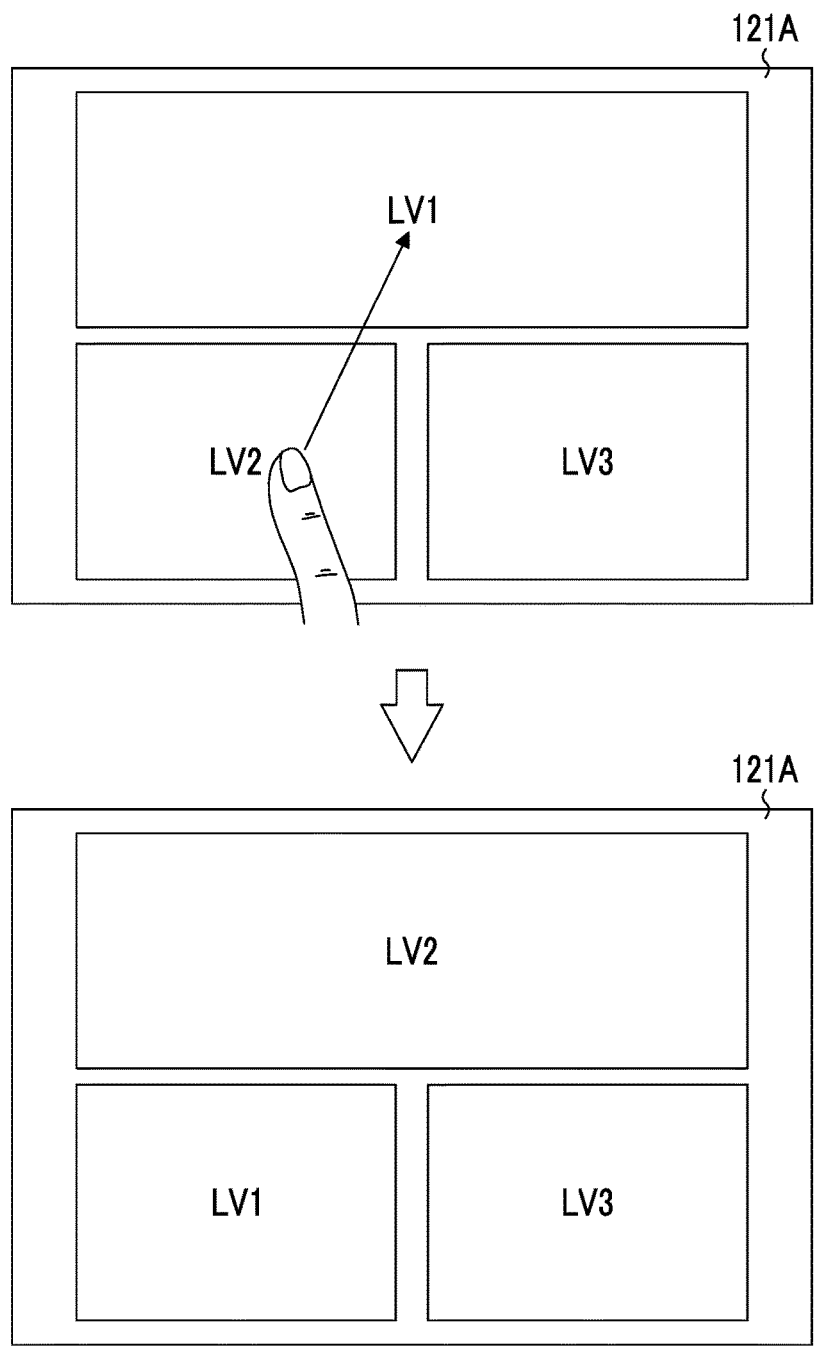
FIG. 9 is a third illustrative diagram that is used for description of setting of a layout (an example of a display aspect).

For example, in a case where "3" is selected as the number of imaging devices and pattern (shape) of the layout indicated by reference sign 313B (hereinafter referred to as "layout 3-2") is selected, six different layouts may be further considered according to a difference between relative frame positions, as illustrated in FIG. 8. For example, in a case where layout (1) in FIG. 8 is a default layout, the user can change a display position and a display size of the live view image through a slide operation, as illustrated in FIG. 9. The live view images LV1 to LV3 are not displayed in this step. Only the display size or only the display position may be changed according to the layout pattern.

Layout information indicating the layout selected by the user is stored in the storage unit 150. Here, the layout information includes information indicating at least the display size and the display position of each live view image.

The priority setting unit 234 of the smartphone 100 sets the priority of the plurality of live views corresponding to the plurality of respective imaging devices 10A to 10C, among the plurality of live view images, on the basis of the layout (which is an example of a display aspect) selected in step S102 (step S104: an example of a display aspect). For example, as shown in FIG. 4, priority 1 is set for a live view image LV1 that is input from the imaging device 10A later, and priority 2 is set for a live view image LV2 that is input from the imaging device 10B later and a live view image LV3 that is input from the imaging device 10C later. Here, the priority is set on the basis of the layout (which is an example of a display aspect) of the plurality of live view images LV1, LV2, and LV3 instead of being set on the basis of which of the plurality of imaging devices 10A, 10B, and 10C inputs the live view image. In FIG. 4, the priority is set to be different among at least some of combinations of a plurality of live view images.

The transfer condition setting unit 236 of the smartphone 100 sets initial transfer conditions of the plurality of live view images that are transmitted from the plurality of imaging devices 10A to 10C to the smartphone 100 (step S106). In this step, the same frame rate and the same image size are set for the plurality of live view images LV1, LV2, and LV3. That is, transfer conditions under which a high transfer rate is allowed are set regardless of the priority by usually regarding a load as being small.

It is determined whether or not an imaging preparation instruction for imaging performed by the plurality of imaging devices 10A to 10C is input to the instruction input unit 212 of the smartphone 100 (step S108). For example, in a case where pressing of the release button icon 125 in FIG. 6 is performed once, the imaging preparation instruction is determined to be input.

In a case where the imaging preparation instruction is input to the instruction input unit 212 of the smartphone 100 (YES in step S108), the instruction output unit 204 (wireless communication unit 110) of the smartphone 100 transmits (outputs) the imaging preparation instruction and the initial transfer conditions to the plurality of imaging devices 10A to 10C through the wireless communication (step S110).

The plurality of imaging devices 10A to 10C that have received (input) the imaging preparation instruction and the initial transfer conditions start of transmission (output) of the live view image to the smartphone 100 through the wireless communication. The image input unit 202 (wireless communication unit 110) of the smartphone 100 receives (input) a plurality of live view images from the plurality of imaging devices 10A to 10C through wireless communication.

The execution control unit 250 of the smartphone 100 determines whether the live view image has been received from at least one of the plurality of imaging devices 10A to 10C (step S112).

Figure 10:
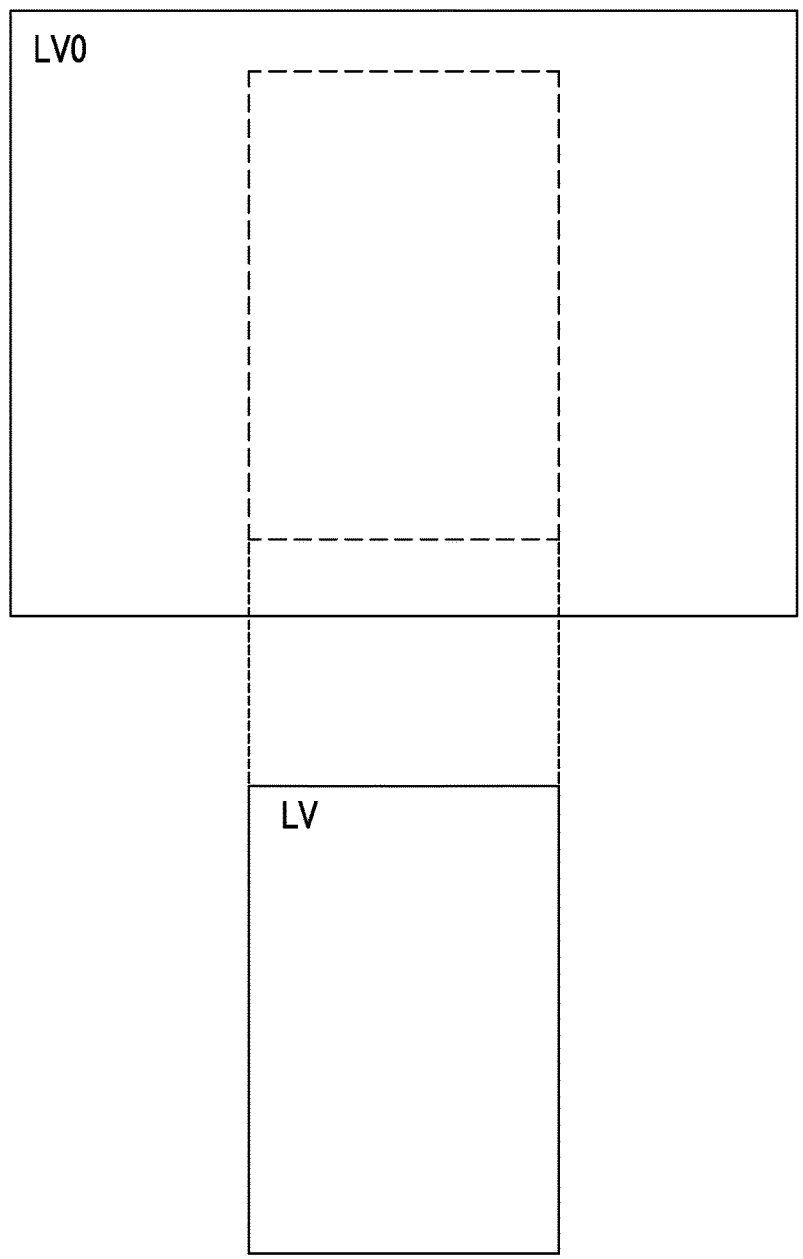
FIG. 10 is an illustrative diagram that is used for description of trimming of a live view image.

The image processing unit 242 of the smartphone 100 trims the received live view image LV0 to extract the live view image LV for a display, as illustrated in FIG. 10 (step S114).

Figure 11:
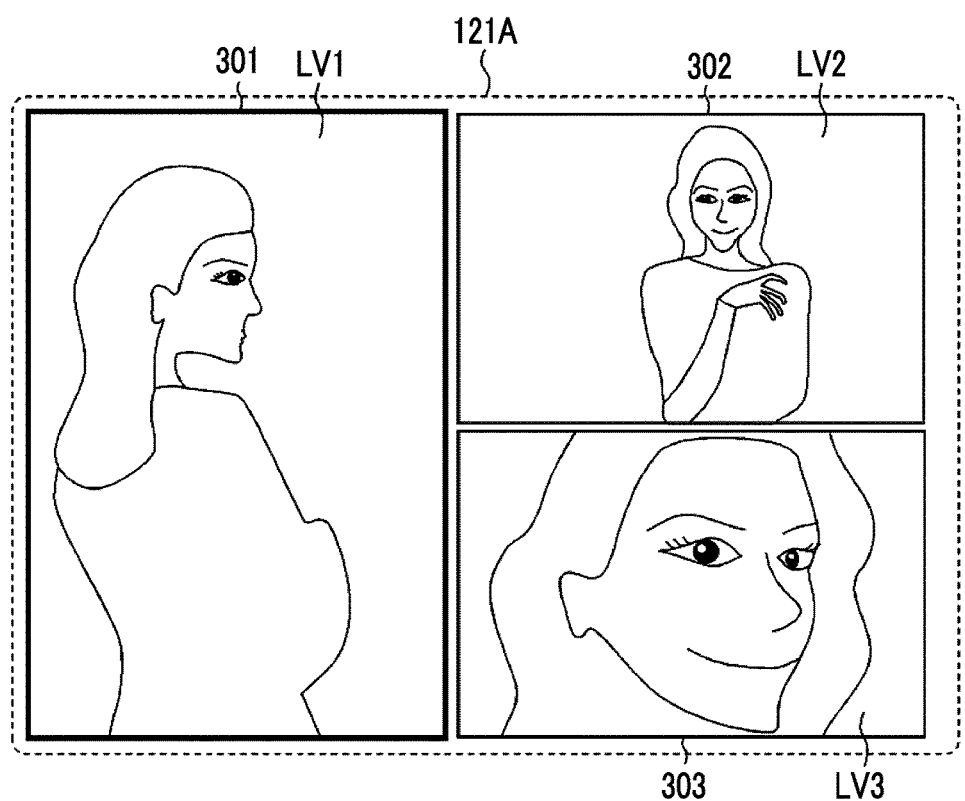
FIG. 11 is an illustrative diagram of a live view image display example in the first embodiment of the live view control method.

The display control unit 244 of the smartphone 100 displays the plurality of live view images LV1, LV2, and LV3, (corresponding to LV in FIG. 10) in the plurality of respective regions 301, 302, and 303 of the display panel 121 of the display and input unit 120, as illustrated in FIG. 11 (step S116).

The execution control unit 250 of the smartphone 100 determines whether or not changing the layout of the live view image display has been performed (step S118). In a multi-live view screen illustrated in FIG. 6, the layout of the live view image display can be changed in a state where the live view images LV1, LV2, and LV3 are displayed. The display aspect setting unit 232 in this example receives a change in the layout in the multi-live view screen.

In a case where changing the layout of the live view image display has been performed (YES in step S118), the priority is reset on the basis of the changed layout (step S120: an aspect of the priority setting step).

The transfer condition change determination unit 240 of the smartphone 100 compares at least one of the actual frame rate (measurement value) and the actual image size (measurement value) of the live view image transfer detected by the load detection unit 238 of the smartphone 100 with a threshold value to determine whether or not the transfer conditions are changed (step S122: an aspect of a first determining step, a second determination step, and a third determination step).

In a case where the actual frame rate of the live view image transfer is smaller than the threshold value (YES in step S122), the transfer condition setting unit 236 of the smartphone 100 performs setting for changing the transfer conditions on the basis of the priority of the plurality of live view images (step S124: an aspect of a transfer condition setting step). That is, the transfer conditions are changed on the basis of the determination result of step S122. For example, the transfer condition setting unit 236 of the smartphone 100 decreases the frame rate (which is a set value) of the transfer of the live view image having a priority of level 2 or less.

That is, in a case where at least one of the transfer load of the live view image from the imaging device 10 to the smartphone 100 and the processing load of the live view image in the smartphone 100 is determined to increase when discomfort of viewing of the live view image is given to the user, transfer conditions of the live view image having a low priority are changed into a low transfer amount. For example, in a case where a threshold value of the actual frame rate is set as 20 fps (frame per second) and the actual frame rate (measurement value) detected by the load detection unit 238 is 15 fps, changing is performed to reduce the frame rate (set value) of the transfer since the actual frame rate (15 fps) is smaller than the threshold value (20 fps). The image size of the transfer may be changed together with the transfer of the frame rate. The present invention includes a case where only the image size of the transfer is changed.

The instruction output unit 204 (wireless communication unit 110) of the smartphone 100 transmits (outputs) the changed transfer conditions to the necessary imaging device among the plurality of imaging devices 10A to 10C through radio communication (step S126).

It is determined whether or not an instruction of imaging that is performed by the plurality of imaging devices 10A to 10C is input to the instruction input unit 212 of the smartphone 100 (step S128). For example, the imaging instruction is determined to have been input in a case where pressing of the release button icon 125 in FIG. 6 is performed in a state in which the live view image is displayed.

In a case where the imaging instruction has been input to the instruction input unit 212 of the smartphone 100 (YES in step S128), the instruction output unit 204 (wireless communication unit 110) of the smartphone 100 transmits (output) the imaging instruction to the plurality of imaging devices 10A to 10C through wireless communication (step S130).

In the plurality of imaging devices 10A to 10C, imaging of a subject is performed. The image input unit 202 (wireless communication unit 110) of the smartphone 100 receives (inputs) a plurality of captured images from the plurality of imaging devices 10A to 10C through wireless communication (step S132).

The execution control unit 250 of the smartphone 100 records the plurality of captured images in the storage unit 150 of the smartphone 100, and displays at least one of the plurality of captured images on the display panel 121 of the display and input unit 120 of the smartphone 100 (step S134).

<Another Instruction Input Example of Display Size and Display Position>

Although an aspect of the instruction input for the display size and the display position of the live view image has been described with reference to FIGS. 6 to 9, the instruction input may be performed according to other aspects.

Figure 12:
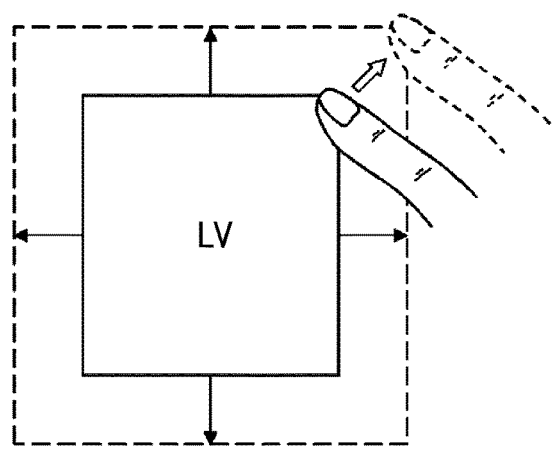
FIG. 12 is an illustrative diagram illustrating a variation of a display size change of a live view image.

As illustrated in FIG. 12, an instruction input for changing the display size of the live view image LV may be performed by touching and sliding a frame of the display area of the live view image LV with a finger or the like.

Figure 13:
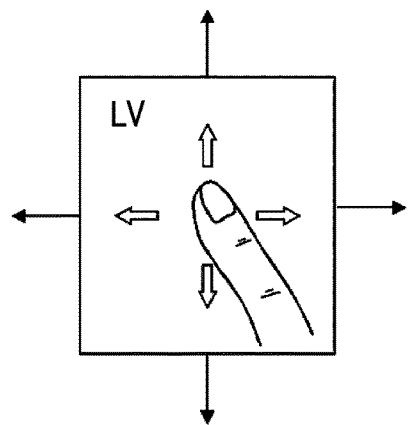
FIG. 13 is an illustrative diagram illustrating a variation of a display position change of a live view image.

As illustrated in FIG. 13, an instruction input for changing the display position of the live view image LV may be performed by touching and sliding a region within the frame of the live view image LV with the finger or the like.

Figure 14:
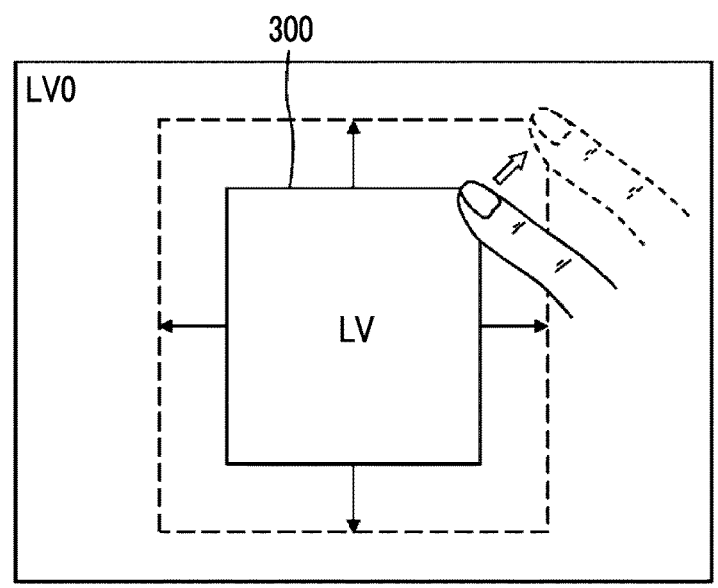
FIG. 14 is an illustrative diagram of a trimming range change of a live view image.

Although the range of the trimming illustrated in FIG. 10 is automatically set by selecting the pattern of the layout in the case of the scheme of selecting the layout pattern as illustrated in FIGS. 6 to 8, the instruction input for changing the trimming range of the live view image may be received from the user as illustrated in FIG. 14. In the example illustrated in FIG. 14, the range of trimming from the live view image LV 0 (original live view image) that is received from the imaging device 10 can be changed by touching and sliding the frame 300 of the display area of the live view image LV with the finger or the like.

<Another Embodiment of Live View Control Method>

Figure 15:
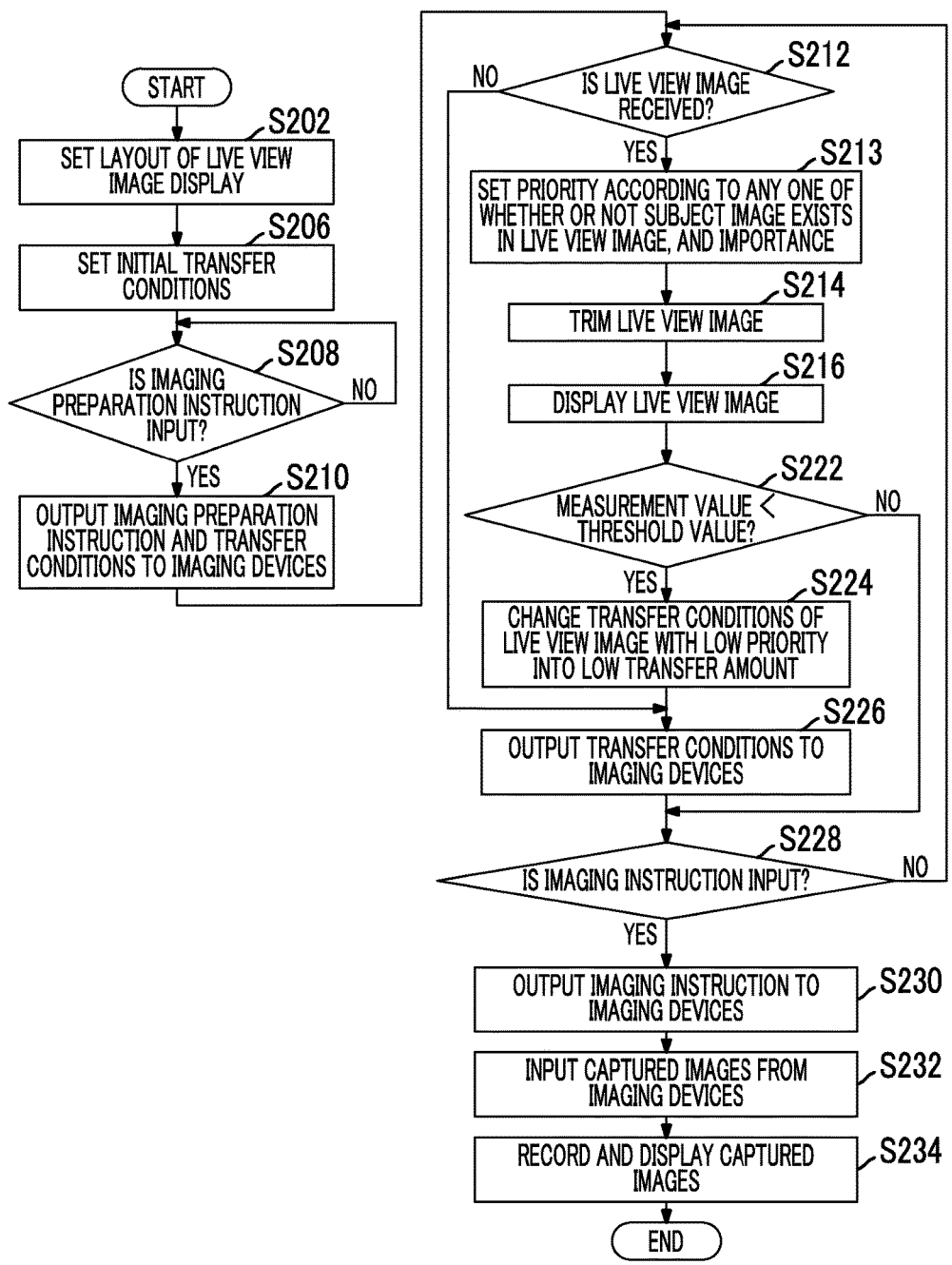
FIG. 15 is a flowchart illustrating a flow of a second embodiment of the live view control method.

FIG. 15 is a flowchart illustrating a flow of the second embodiment of the live view control method. In FIG. 15, processing in the smartphone 100 is executed by the execution control unit 250 of the smartphone 100 according to a program stored in the storage unit 150 of the smartphone 100. It is assumed that the imaging device 10 is in a state in which the power switch has already been turned on and initialization has been completed.

Steps S202, S206, S208, S210 and S212 are the same as steps S102, S106, S108, S110, and S112 of the first embodiment of the live view control method illustrated in FIG. 5, respectively, and description thereof will be omitted herein.

However, in the second embodiment, the priority of the plurality of live view images is set according to the display situation of the plurality of live view images, unlike the first embodiment (which is an example in which the priority of the plurality of live view images is set according to the display aspects of the plurality of live view images).

Figure 16:
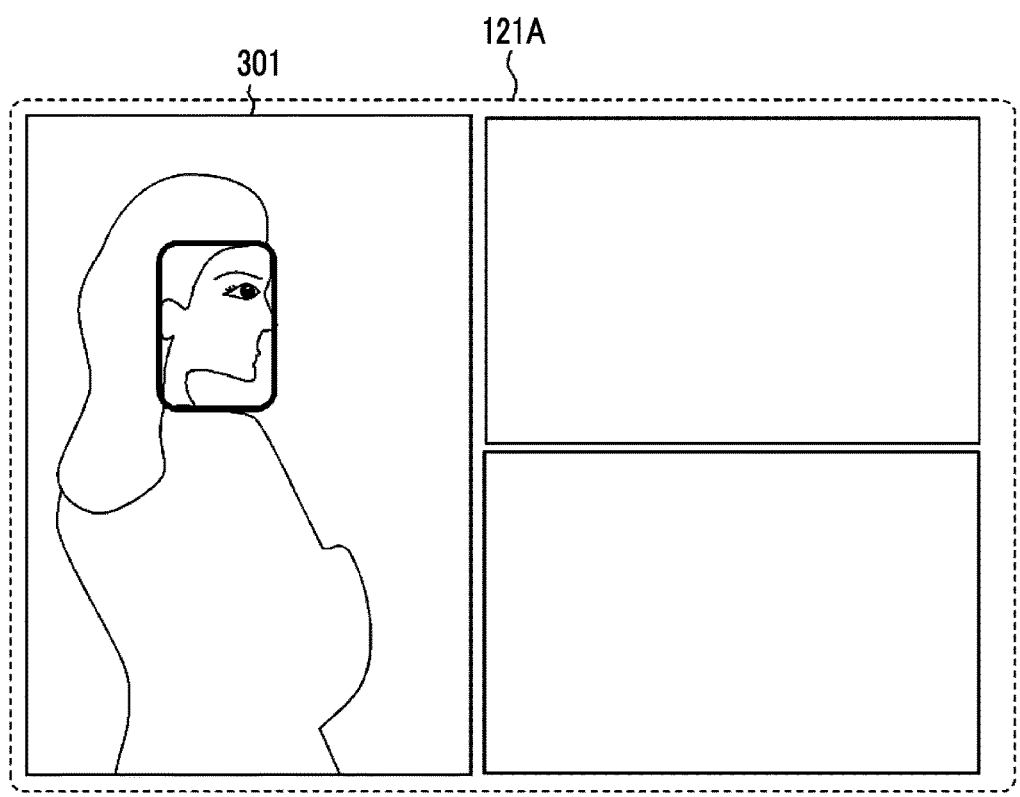
FIG. 16 is an illustrative diagram of a live view image display example in the second example of the live view control method.

In step S213 (which is an aspect of the priority setting step), the priority setting unit 234 of the smartphone 100 sets the priority of the live view image according to at least one determination condition among whether or not a predetermined specific subject image exists in the live view image (hereinafter referred to as "presence or absence of the subject image") and which of a plurality of subject images having a predetermined priority (which indicates an order of importance among the plurality of subject images) is the subject image in the live view image (hereinafter referred to as "importance of the live view image"). For example, it is determined that a predetermined subject image exists in the first image display area 301 or a subject image with high importance exists through face detection in the display screen illustrated in FIG. 16.

Steps S214 to S234 are the same as steps S114 to S116 and S122 to S134 of the first embodiment of the live view control method illustrated in FIG. 5, and description thereof will be omitted herein.

Figure 17:
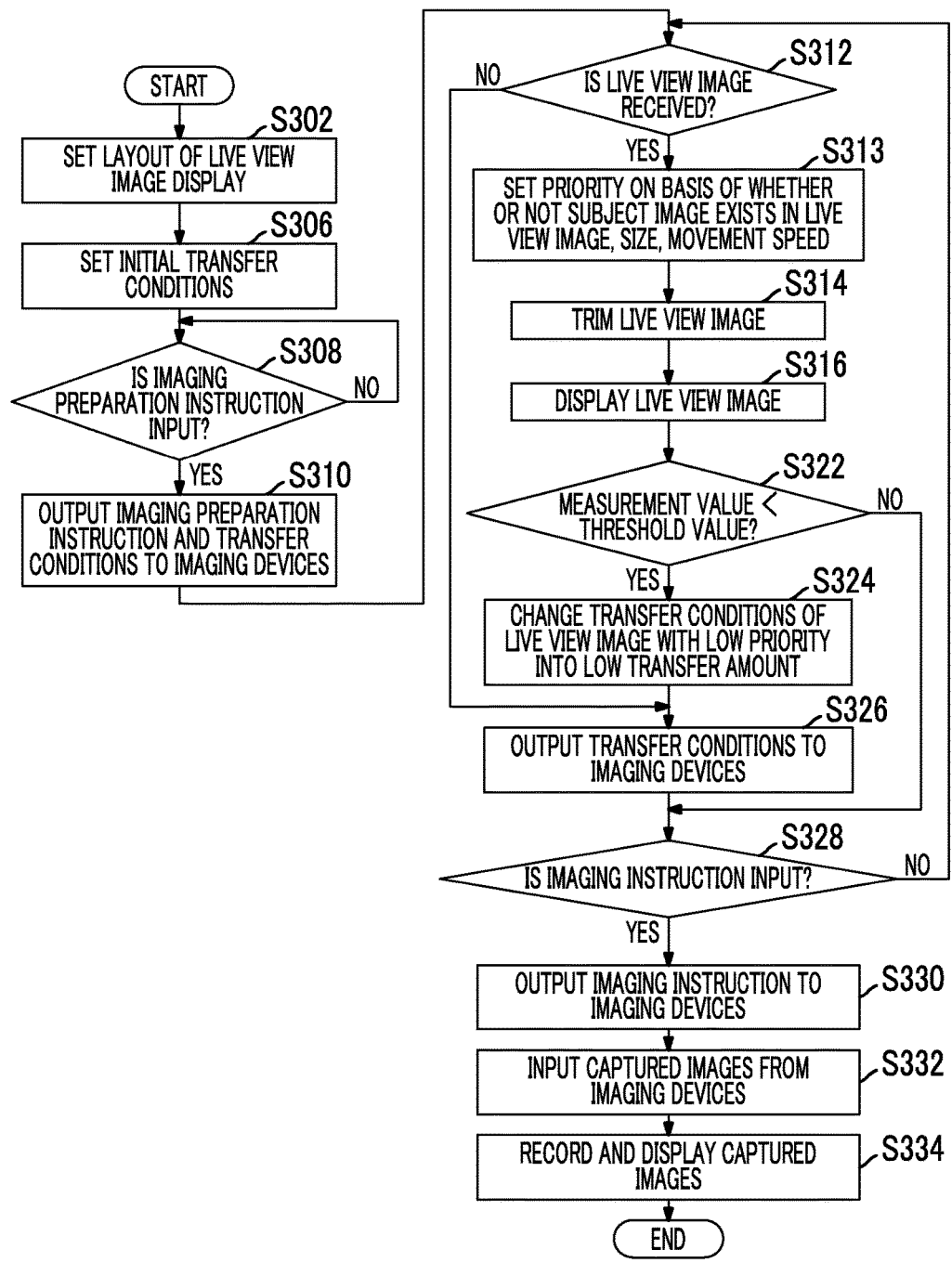
FIG. 17 is a flowchart illustrating a flow of a third embodiment of the live view control method.

FIG. 17 is a flowchart illustrating a flow of the third embodiment of the live view control method. In FIG. 17, processing in the smartphone 100 is executed by the execution control unit 250 of the smartphone 100 according to a program stored in the storage unit 150 of the smartphone 100. It is assumed that the imaging device 10 is in a state in which the power switch has already been turned on and initialization has been completed.

Steps S302, S306, S308, S310, and S312 are the same as steps S102, S106, S108, S110, and S112 of the first embodiment of the live view control method illustrated in FIG. 5, respectively, and description thereof will be omitted herein.

However, in the third embodiment, a priority of a plurality of live view images is set according to the display situation of the live view images, unlike the first embodiment (which is an example in which the priority of the plurality of live view images is set according to the display aspect of the plurality of live view images).

Figure 18:
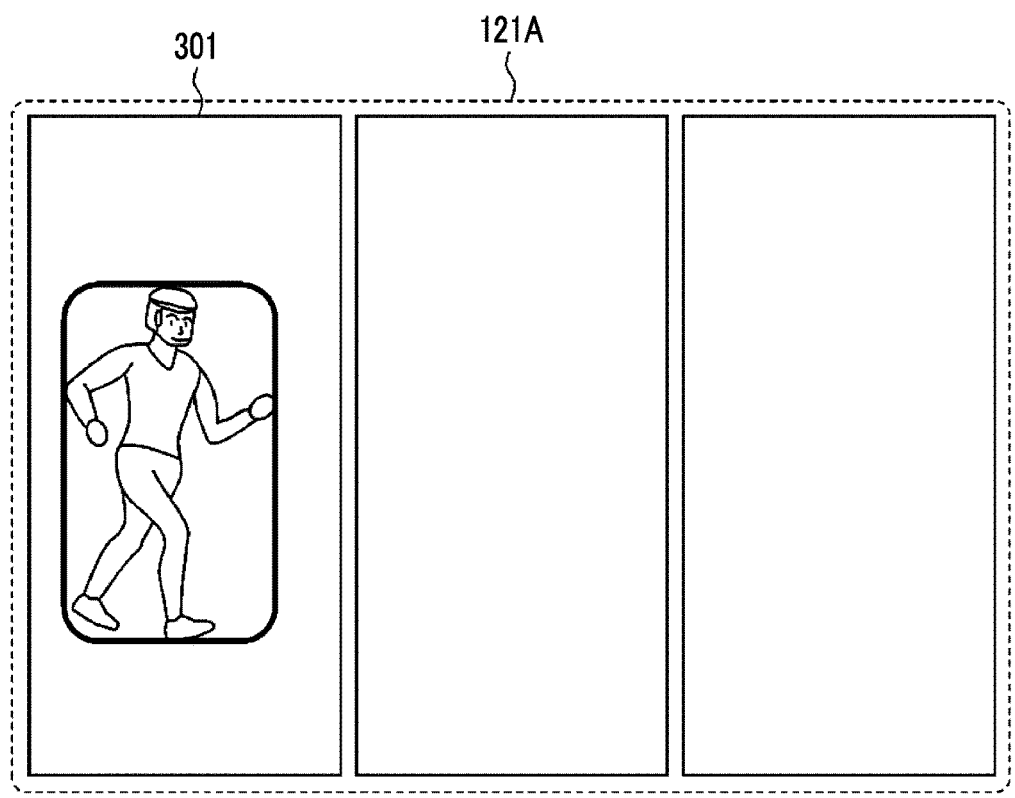
FIG. 18 is an illustrative diagram of a live view image display example in the third embodiment of the live view control method.

In step S313 (which is an aspect of a priority setting step), the priority setting unit 234 of the smartphone 100 sets the priority of the live view image according to at least one determination condition among whether or not a moving body image exists in the live view image (hereinafter referred to as "presence or absence of a moving body image"), a size of the moving body image in the live view image, and a movement speed of the moving body image in the live view image. For example, the moving subject image is determined to exist in the first image display area 301 through moving object detection in the display screen illustrated in FIG. 18.

Steps S314 to S334 are the same as steps S114 to S116 and S122 to S134 in the first embodiment of the live view control method illustrated in FIG. 5, and description thereof will be omitted herein.

[Variation of instruction input for priority]

The case where the priority setting unit 234 of the smartphone 100 sets the priority of the plurality of live view images among the plurality of live view images on the basis of at least one of the display aspect and the display situation of the plurality of live view images has been described by way example, the present invention is not limited to such a case.

The display and input unit 120 (instruction input unit 212) may receive the instruction input for the priority of the plurality of live view images from the user. For example, in a case where a specific touch operation (for example, double tap) is performed on a specific display area (for example, a display area indicated by reference numeral 303) among display areas 301 to 303 of the plurality of live view images in the screen illustrated in FIG. 11, the priority of the live view image in the display area (for example, the display area indicated by reference numeral 303) in which the specific touch operation has been performed is made higher than that of the other display areas (for example, display areas indicated by reference numerals 301 and 302). An instruction input for the priority may be received by receiving the input of identification information (for example, identification number) of each of the plurality of live view images. The instruction input for the priority may be received by the operation unit 140. In this variation, the display and input unit 120 and the operation unit 140 are examples of a priority instruction input unit in the present invention.

[Variations of System Configuration]

Figure 19:
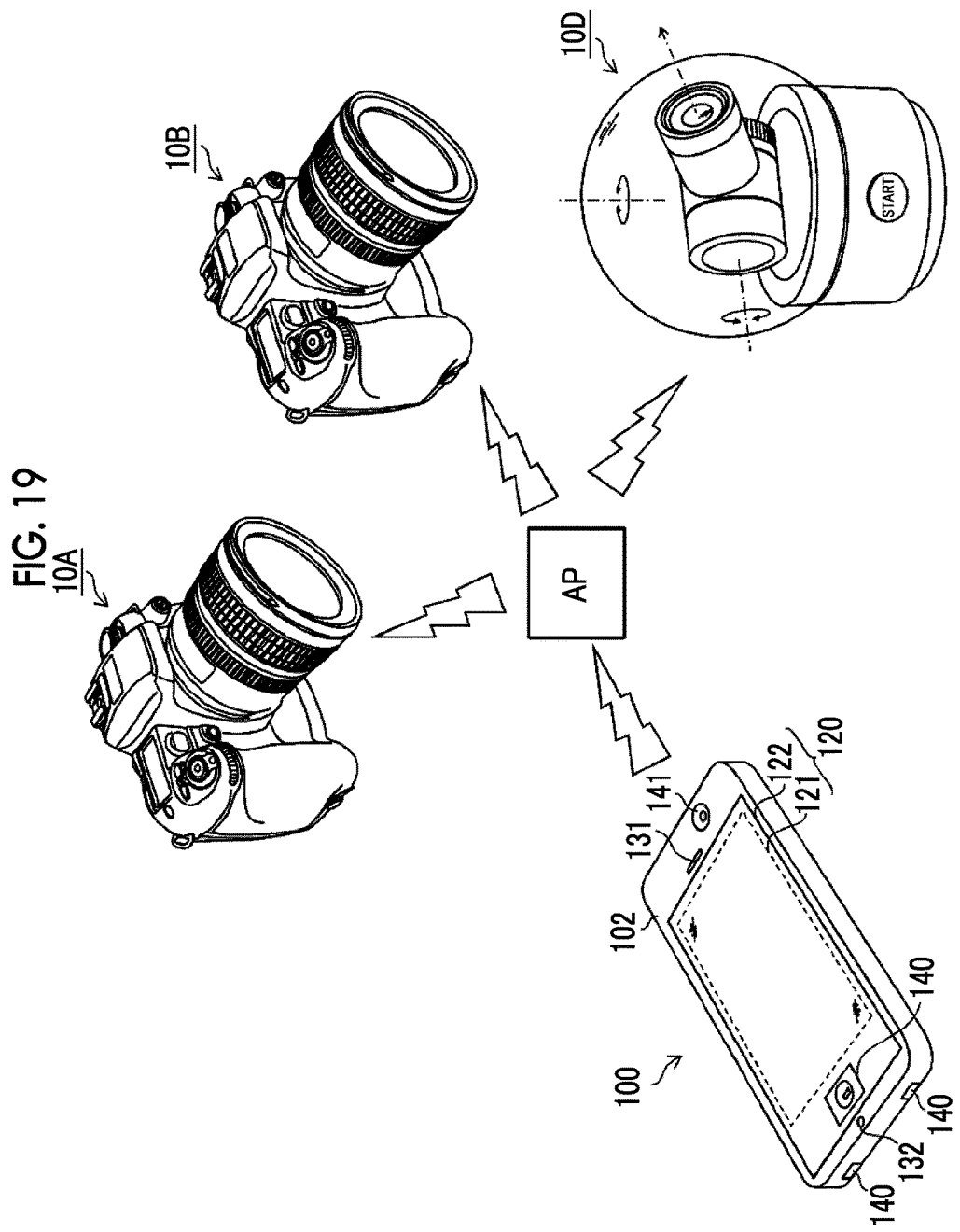
FIG. 19 is a configuration diagram illustrating another example of a live view system including an imaging device and a smartphone.

Although the case in which the present invention is applied to the first wireless communication aspect in which the imaging device 10 and the smartphone 100 that is an example of an a live view control unit directly perform the wireless communication as illustrated in FIG. 1 has been described in detail, the present invention may be applied to a second wireless communication aspect illustrated in FIG. 19.

In FIG. 19, imaging devices 10A, 10B, and 10D and a smartphone 100 that is an example of a live view control device indirectly perform wireless communication via an access point AP. In such a live view system, a load in transfer between the imaging devices 10A, 10B, and 10D and the access point AP and a load in transfer between the access point AP and the smartphone 100 are included as transfer loads of the live view image. Further, a processing load for the live view image in the access point AP is added as the transfer load of the live view image. The present invention is also applicable to such a live view system.

In the case of FIG. 19, the imaging devices 10A and 10B and the imaging device 10D are different in a model. The imaging device 10D is a pan and tilt camera in which an imaging unit including an imaging lens and an imaging element is rotatable in a pan direction and a tilt direction. The present invention is applicable to a case where the model is different between the imaging devices.

Further, the present invention is not particularly limited to the examples described in this specification and the accompanying drawings, and may be implemented in aspects different from the examples described in this specification and the accompanying drawings without departing from the gist of the present invention.

EXPLANATION OF REFERENCES

10 (10A, 10B, 10C, 10D): imaging device
100: smartphone (live view control device)
101: main control unit
110: wireless communication unit
120: display and input unit
121: display panel
122: operation panel
202: image input unit
204: instruction output unit
212: instruction input unit (display aspect instruction input unit, priority instruction input unit)
232: display aspect setting unit
234: priority setting unit
236: transfer condition setting unit
238: load detection unit
240: transfer condition change determination unit
242: image processing unit
244: display control unit
246: display situation detection unit
248: communication control unit
250: execution control unit

What is claimed is:

1. A live view control device, comprising:
a processor configured to:
receive a plurality of live view images from a plurality of imaging devices through wireless communication;
display each of the plurality of live view images received from the plurality of imaging devices in each of a plurality of areas of a display screen capable of displaying an image;
set a priority of the plurality of live view images among the plurality of live view images;
set transfer conditions including at least one of a frame rate of transfer and an image size of the transfer of the plurality of live view images on the basis of the priority of the plurality of live view images;
transmit the transfer conditions set by the processor to the plurality of imaging devices via wireless communication; and
determine whether or not the transfer conditions are changed on the basis of a result of comparison between at least one of an actual frame rate and an actual image size of one or a plurality of live view images having a specific priority or a higher priority received from the plurality of imaging devices among the plurality of live view images and a threshold value,
wherein the processor changes the transfer conditions on the basis of a determination result of the processor.

2. The live view control device according to claim 1, wherein the processor sets the priority of the plurality of live view images on the basis of at least one of a display aspect and a display situation of the live view image.

3. The live view control device according to claim 2, wherein the processor sets the priority of the live view image according to at least one of a display size and a display position of the live view image.

4. The live view control device according to claim 3, wherein the processor is further configured to receive an instruction input for at least one of a display size and a display position of the live view image.

5. The live view control device according to claim 4, wherein the processor sets the priority of the live view image according to whether a predetermined specific subject image exists in the live view image, or which of a plurality of subject images having a predetermined priority is the subject image in the live view image.

6. The live view control device according to claim 5, wherein the processor the priority of the live view image according to at least one of whether or not a moving body image exists in the live view image, a size of the moving body image in the live view image, and a movement speed of the moving body image.

7. The live view control device according to claim 1, wherein the processor is further configured to receive an instruction input for a priority of the plurality of live view images.

8. A live view system, comprising:
imaging devices; and
the live view control device according to claim 1.

9. A live view control device, comprising:
a processor configured to:
receive a plurality of live view images from a plurality of imaging devices through wireless communication;
display each of the plurality of live view images received from the plurality of imaging devices in each of a plurality of areas of a display screen capable of displaying an image;

set a priority of the plurality of live view images among the plurality of live view images;
set transfer conditions including at least one of a frame rate of transfer and an image size of the transfer of the plurality of live view images on the basis of the priority of the plurality of live view images;
transmit the transfer conditions set by the processor to the plurality of imaging devices via wireless communication; and
determine whether or not the transfer conditions are changed on the basis of a result of comparison between a sum over the plurality of imaging devices of at least one of an actual frame rate and an actual image size of the plurality of live view images and a threshold value,
wherein the processor changes the transfer conditions in a case where the processor determines that the transfer conditions are changed.

10. A live view control device, comprising:
a processor configured to:
receive a plurality of live view images from a plurality of imaging devices through wireless communication;
display each of the plurality of live view images received from the plurality of imaging devices in each of a plurality of areas of a display screen capable of displaying an image;
set a priority of the plurality of live view images among the plurality of live view images;
set transfer conditions including at least one of a frame rate of transfer and an image size of the transfer of the plurality of live view images on the basis of the priority of the plurality of live view images;
transmit the transfer conditions set by the processor to the plurality of imaging devices via wireless communication; and
determine whether or not the transfer conditions are changed on the basis of both of an actual frame rate and an actual image size of the plurality of live view image,
wherein the processor changes the transfer conditions in a case where the processor determines that the transfer conditions are changed.

11. A live view control method, comprising:
a step of receiving a plurality of live view images from a plurality of imaging devices through wireless communication;
a step of displaying each of the plurality of live view images received from the plurality of imaging devices in each of a plurality of areas of a display screen capable of displaying an image;
a priority setting step of setting a priority of the plurality of live view images among the plurality of live view images;
a transfer condition setting step of setting transfer conditions including at least one of a frame rate of transfer and an image size of the transfer of the plurality of live view images on the basis of the priority of the plurality of live view images;
a step of transmitting the set transfer conditions to the plurality of imaging devices through wireless communication; and
a first determination step of determining whether or not the transfer conditions are changed on the basis of a result of comparison between at least one of an actual frame rate and an actual image size of one or a plurality of live view images having a specific priority or a higher priority received from the plurality of imaging devices among the plurality of live view images and a threshold value,
wherein the transfer conditions are changed on the basis of a determination result of the first determination step.

12. The live view control method according to claim 11, wherein the priority setting step includes setting the priority of the plurality of live view images on the basis of at least one of a display aspect and a display situation of the live view image.

13. The live view control method according to claim 11, wherein the priority setting step includes setting the priority of the live view image according to at least one of a display size and a display position of the live view image.

14. The live view control method according to claim 11, wherein the priority setting step includes setting the priority of the live view image according to whether a predetermined specific subject image exists in the live view image, or which of a plurality of subject images having a predetermined priority is the subject image in the live view image.

15. The live view control method according to claim 11, wherein the priority setting step includes setting the priority of the live view image according to at least one of whether or not a moving body image exists in the live view image, a size of the moving body image in the live view image, and a movement speed of the moving body image.

16. A live view control method, comprising:
a step of receiving a plurality of live view images from a plurality of imaging devices through wireless communication;
a step of displaying each of the plurality of live view images received from the plurality of imaging devices in each of a plurality of areas of a display screen capable of displaying an image;
a priority setting step of setting a priority of the plurality of live view images among the plurality of live view images;
a transfer condition setting step of setting transfer conditions including at least one of a frame rate of transfer and an image size of the transfer of the plurality of live view images on the basis of the priority of the plurality of live view images;
a step of transmitting the set transfer conditions to the plurality of imaging devices through wireless communication; and
a second determination step of determining whether or not the transfer conditions are changed on the basis of a result of comparison between a sum over the plurality of imaging devices of at least one of an actual frame rate and an actual image size of the plurality of live view images and a threshold value,
wherein the transfer conditions are changed on the basis of a determination result of the second determination step.

17. A live view control method, comprising:
a step of receiving a plurality of live view images from a plurality of imaging devices through wireless communication;
a step of displaying each of the plurality of live view images received from the plurality of imaging devices in each of a plurality of areas of a display screen capable of displaying an image;
a priority setting step of setting a priority of the plurality of live view images among the plurality of live view images;
a transfer condition setting step of setting transfer conditions including at least one of a frame rate of transfer and an image size of the transfer of the plurality of live view images on the basis of the priority of the plurality of live view images; and a step of transmitting the set transfer conditions to the plurality of imaging devices through wireless communication; and a third determination step of determining whether or not the transfer conditions are changed on the basis of both of an actual frame rate and an actual image size of the plurality of live view image, wherein the transfer conditions are changed on the basis of a determination result of the third determination step.

18. A computer-readable non-transitory recording medium having a program that causes a computer to execute:

a step of receiving a plurality of live view images from a plurality of imaging devices through wireless communication;

a step of displaying each of the plurality of live view images received from the plurality of imaging devices in each of a plurality of areas of a display screen capable of displaying an image;

a priority setting step of setting a priority of the plurality of live view images among the plurality of live view images;

a transfer condition setting step of setting transfer conditions including at least one of a frame rate of transfer and an image size of the transfer of the plurality of live view images on the basis of the priority of the plurality of live view images;

a step of transmitting the set transfer conditions to the plurality of imaging devices through wireless communication; and a first determination step of determining whether or not the transfer conditions are changed on the basis of a result of comparison between at least one of an actual frame rate and an actual image size of one or a plurality of live view images having a specific priority or a higher priority received from the plurality of imaging devices among the plurality of live view images and a threshold value, wherein the transfer conditions are changed on the basis of a determination result of the first determination step.

19. A computer-readable non-transitory recording medium having a program that causes a computer to execute:

a step of receiving a plurality of live view images from a plurality of imaging devices through wireless communication;

a step of displaying each of the plurality of live view images received from the plurality of imaging devices in each of a plurality of areas of a display screen capable of displaying an image;

a priority setting step of setting a priority of the plurality of live view images among the plurality of live view images;

a transfer condition setting step of setting transfer conditions including at least one of a frame rate of transfer and an image size of the transfer of the plurality of live view images on the basis of the priority of the plurality of live view images; and a step of transmitting the set transfer conditions to the plurality of imaging devices through wireless communication;

a second determination step of determining whether or not the transfer conditions are changed on the basis of a result of comparison between a sum over the plurality of imaging devices of at least one of an actual frame rate and an actual image size of the plurality of live view images and a threshold value, wherein the transfer conditions are changed on the basis of a determination result of the second determination step.

20. A computer-readable non-transitory recording medium having a program that causes a computer to execute:

a step of receiving a plurality of live view images from a plurality of imaging devices through wireless communication;

a step of displaying each of the plurality of live view images received from the plurality of imaging devices in each of a plurality of areas of a display screen capable of displaying an image;

a priority setting step of setting a priority of the plurality of live view images among the plurality of live view images;

a transfer condition setting step of setting transfer conditions including at least one of a frame rate of transfer and an image size of the transfer of the plurality of live view images on the basis of the priority of the plurality of live view images;

a step of transmitting the set transfer conditions to the plurality of imaging devices through wireless communication; and a third determination step of determining whether or not the transfer conditions are changed on the basis of both of an actual frame rate and an actual image size of the plurality of live view image, wherein the transfer conditions are changed on the basis of a determination result of the third determination step.

* * * * *